United States Patent [19]
Kato et al.

[11] Patent Number: 5,983,635
[45] Date of Patent: Nov. 16, 1999

[54] ROTARY SHAFT COUPLER WITH ROTARY VALVE PLATE POSITION DEPENDENT ON DIRECTION OF SHAFT ROTATION

[75] Inventors: Tadahiko Kato; Kazuhisa Shimada; Masaki Nakamura, all of Kosai, Japan

[73] Assignee: Fuji Univance Corporation, Kosai, Japan

[21] Appl. No.: 08/923,991

[22] Filed: Sep. 5, 1997

Related U.S. Application Data

[62] Division of application No. 08/565,763, Nov. 30, 1995.

[30] Foreign Application Priority Data

Jan. 17, 1995 [JP] Japan ................... 7-0004542
Jan. 17, 1995 [JP] Japan ................... 7-0004545

[51] Int. Cl.$^6$ ..................................... F16D 39/00
[52] U.S. Cl. ............................... 60/487; 91/485
[58] Field of Search ............... 60/413, 487, 489; 91/485, 499; 192/59, 60, 103 F

[56] References Cited

U.S. PATENT DOCUMENTS

| | | |
|---|---|---|
| 2,691,888 | 10/1954 | Nicolas . |
| 4,034,652 | 7/1977 | Huebner . |
| 4,776,257 | 10/1988 | Hansen . |
| 4,914,907 | 4/1990 | Okada ........................................ 60/487 |
| 5,103,842 | 4/1992 | Suzuki et al. . |
| 5,109,754 | 5/1992 | Shaw . |
| 5,325,669 | 7/1994 | Barker et al. ........................ 60/487 X |

Primary Examiner—Hoang Nguyen
Attorney, Agent, or Firm—Wenderoth, Lind & Ponack, L.L.P.

[57] ABSTRACT

A hydraulic power transmission joint provided with a rotary valve in which a first enclosing hole is bored and moreover, a first spool valve, a first spring, a first pin member and a first communicating hole are provided. Further, a second communicating hole is also provided therein in such a manner as to be coaxial with the first communication hole. Moreover, a second enclosing hole having a smaller diameter is bored therein. Furthermore, a second spool valve having a diameter smaller than that of the first spool valve, a second spring, a second pin member, a third communicating hole, a fourth communicating hole and an orifice are provided therein. Further, a valve element, whose position is controlled, is enclosed in a high-pressure chamber formed in the rotary valve. Additionally, a gap between a pin portion of the pin member for holding the valve element and a communicating hole, which provides communication from the high-pressure chamber to the enclosing hole for enclosing the pin member, is used as the orifice for generating fluid resistance.

The orifice is communicates with the high-pressure chamber and is formed in a second-pin-member-side portion of the second enclosing hole; and an orifice which is provided between the third and fourth communicating holes and is adapted to be closed by a movement of the second spool valve and to generate fluid resistance by a flow of discharge oil caused by driving the plungers.

3 Claims, 31 Drawing Sheets

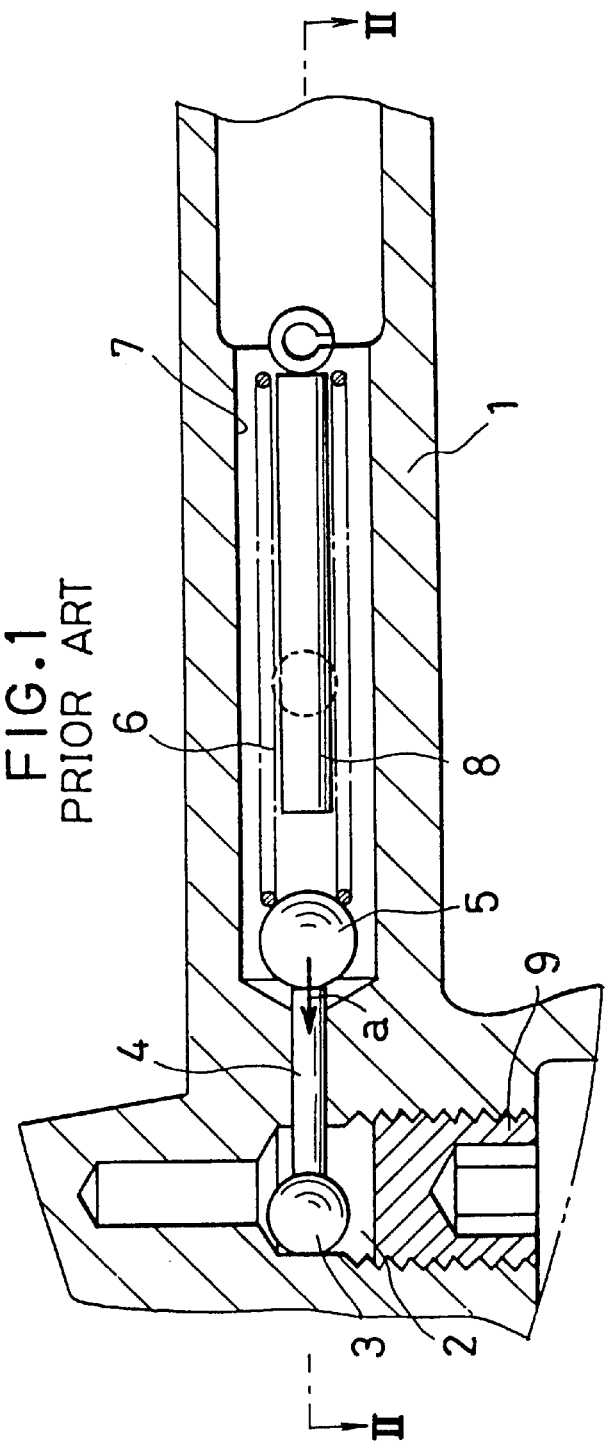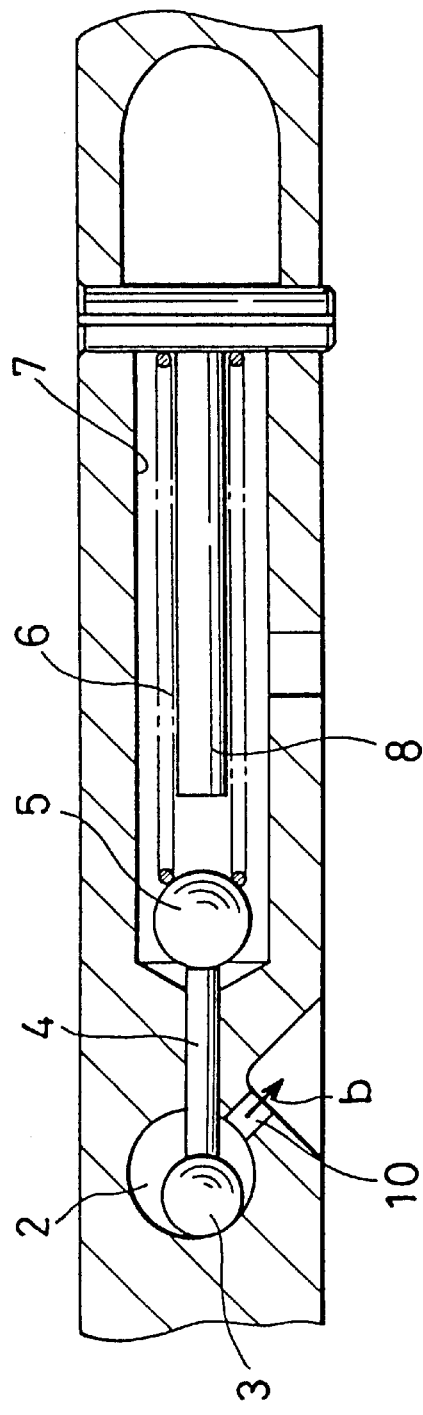

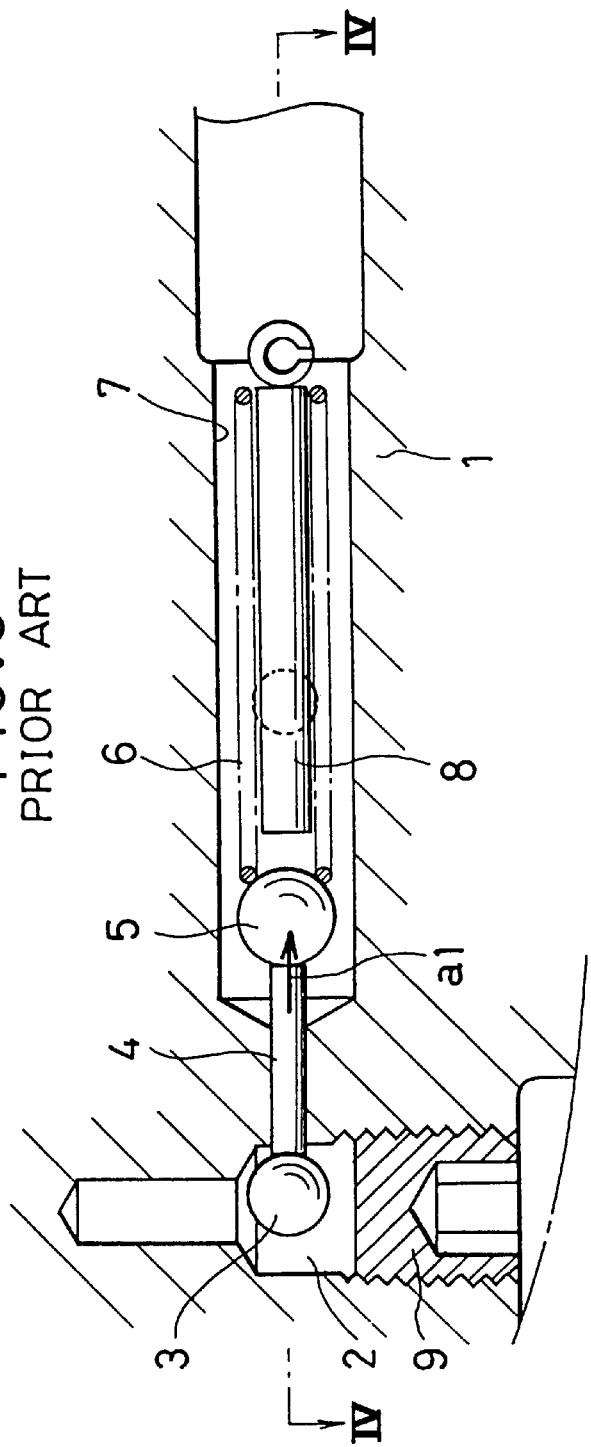
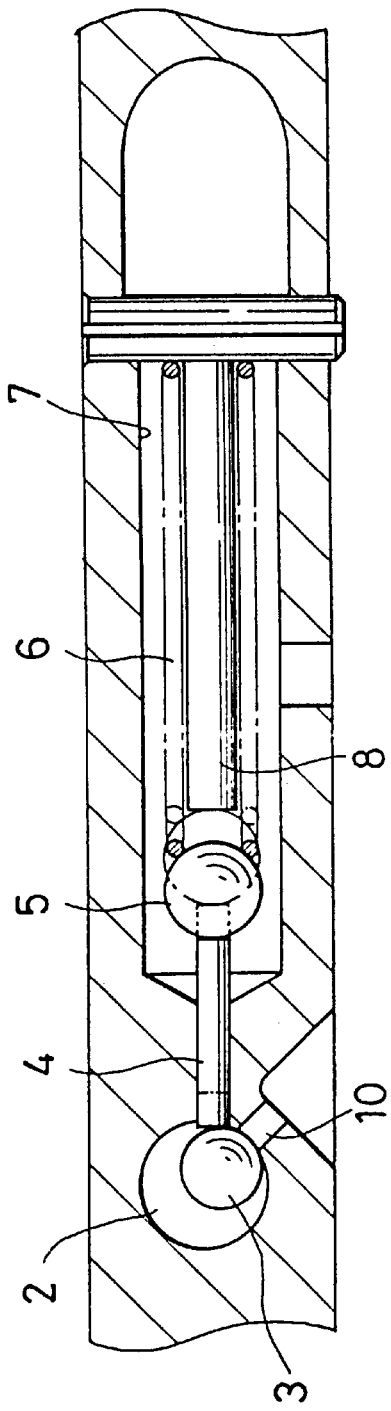
FIG. 3 PRIOR ART
FIG. 4 PRIOR ART

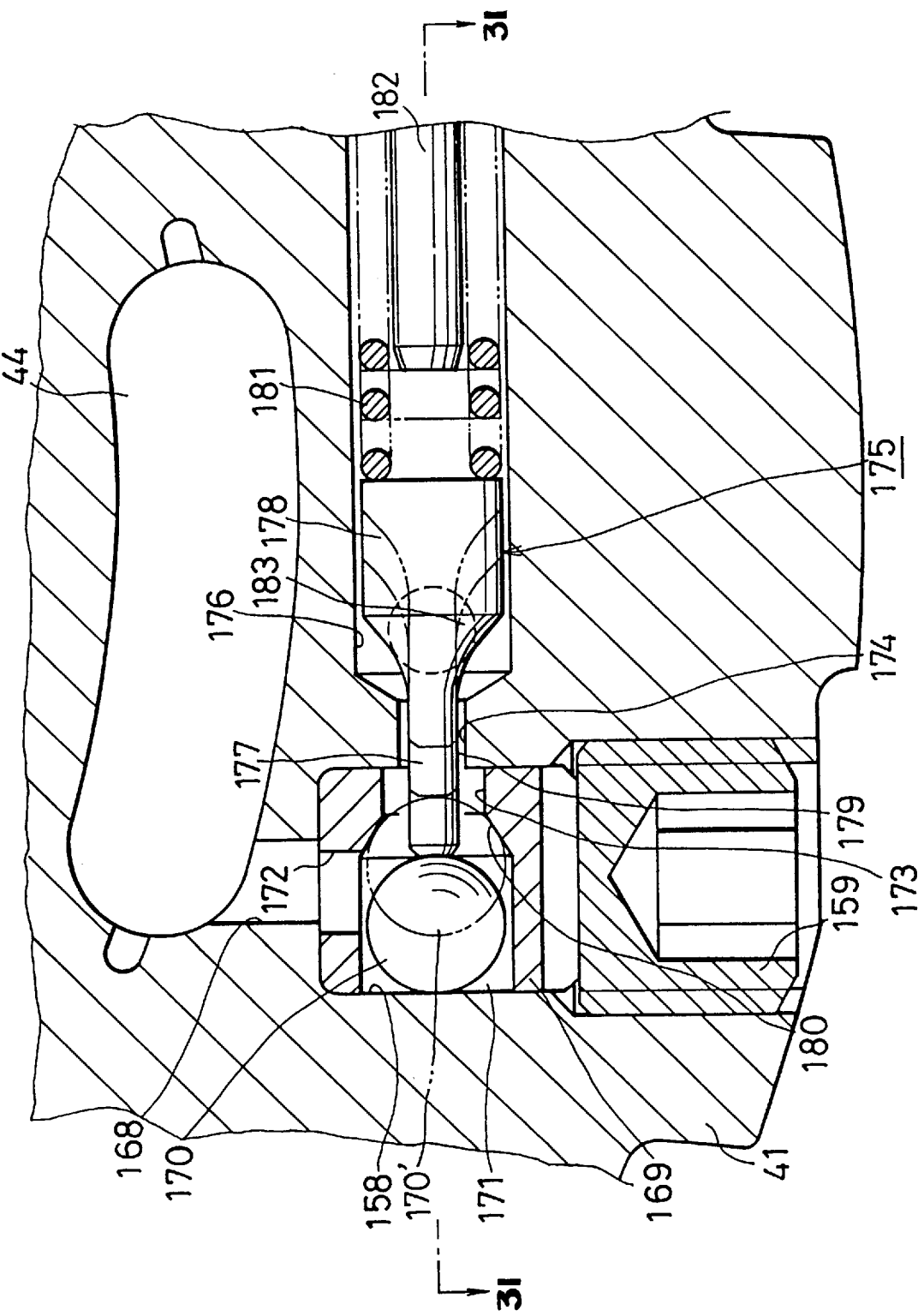

ROTARY SHAFT COUPLER WITH ROTARY VALVE PLATE POSITION DEPENDENT ON DIRECTION OF SHAFT ROTATION

This is a divisional application of Ser. No. 08/565,763, filed Nov. 30, 1995.

BACKGROUND OF THE INVENTION

1. Field of the Invention

The present invention generally relates to a hydraulic power transmission joint to be used for distributing a driving force of a vehicle, and more particularly to a hydraulic power transmission joint which couples two power rotary shafts and transfers a torque corresponding to a difference between the rotational speeds (namely, revolving speeds) thereof.

2. Description of the Related Art

Hitherto, as a conventional hydraulic power transmission joint, there has been known, for example, a joint disclosed in the U.S. Pat. No. 5,103,642. Various torque characteristics such as upped or increased an initial torque, two-stage change of a torque with respect to the difference between the rotational speeds of the power rotary shafts and automatic lock are required for this hydraulic power transmission joint to improve the performance of a vehicle. A valve of FIGS. 1 and 2 for controlling a torque is used to realize such various torque characteristics.

As shown in FIG. 1, a high-pressure chamber 2 communicating with a discharge port (not shown) is formed in a rotary valve 1 of the power transmission joint by plugging an opening thereof with a plug 9. An orifice 10 is made in such a manner as to provide communication from the high-pressure chamber 2 to a low-pressure chamber on the intake-port side (not shown), as illustrated in FIG. 2. A ball valve 3 is enclosed in the high-pressure chamber 2 and is usually pressed by a pin 4 in such a way as to be held in a position as illustrated in these figures. The pin 4 is movably fitted into a passage formed between the high-pressure chamber 2 and an enclosing chamber 7 and is pressed by a spring 6 by way of a ball 5. A stopper pin 8 is enclosed in the spring 6 and is operative to limit the travel of the pin 4 through the ball 5. An oil pressure is low during normal driving, in which the difference between the rotational speeds (or revolving speeds) of the two drive shafts (namely, power drive shafts) is in a range where the torque is equal to or lower than a lock torque Tr corresponding to a small rotational speed difference, the internal oil pressure of the high-pressure chamber 2 is low. Therefore, a pushing force exerted by the spring 6 on the pin 4 through the ball 5, which is designated by an arrow a in FIG. 1, is higher than a pushing force exerted owing to the internal oil pressure of the high-pressure chamber 2 on the pin 4, with the result that the pin 4 holds the ball valve 3 at the position illustrated in these figures. Thus, the orifice 10 opens. Further, oil flows through the orifice 10 as indicated by an arrow b in FIG. 2. In this case, the torque characteristics are represented by a characteristic curve c illustrated in FIG. 5. Namely, in the range d of the rotational-speed difference (or revolving speed difference) in which the torque is equal to or lower than the lock torque Tr, a transfer torque T increases in proportion as the square of a differential revolving speed (namely, a difference between the rotational speeds) $\Delta N$.

In contrast, in the range of the rotational-speed difference (or revolving speed difference) in which the torque is equal to or higher than the lock torque Tr, the pushing force a1 exerted owing to the internal oil pressure of the high-pressure chamber 2 on the pin 4 becomes higher than the pushing force exerted by the spring 6 on the pin 4. Thus, the pin 4 moves against the force of the spring 6, with the result that the ball valve 3 becomes free and the orifice 10 is closed.

Thereby, a channel or passage from the discharge port to the intake port is closed. As a result, the torque characteristics become those as represented by a graph e of FIG. 6 (namely, an automatic lock torque characteristic), in which the two drive shafts rotate in a body. In the case that the differential revolving speed $\Delta N$ decreases and the torque is lowered to the lock torque Tr and thus the lock is canceled during exhibiting the lock characteristics e, a force becomes needed for pushing the ball valve 3, which has closed the orifice 10, away therefrom. Thus, when the oil pressure drops to a value at which a torque Tk equal to or less than the lock torque Tr is transferred, the ball valve 3 opens and the torque having the lock characteristics e is returned to the characteristic region of FIG. 5. At that time, the torque Tk can be arbitrarily set by regulating a position, at which the orifice 10 and the ball valve 3 are in contact with each other, and a position at which the pin 4 and the ball valve 3 are in contact with each other. It is preferable for preventing an occurrence of hunting in the ball valve 3 to cancel the lock when the internal oil pressure of the high-pressure chamber 2 falls to an oil pressure corresponding to the torque Tk which is a little lower than the lock torque Tr.

FIG. 7 illustrates another conventional hydraulic power transmission joint, the rotary valve 11 of which is a valve mechanism for controlling the torque characteristics. A high-pressure chamber 12 communicating with a discharge port of a plunger piston is formed in a surface portion of the rotary valve 11. Further, a communicating groove 13 for providing communication between or among a plurality of high-pressure chambers is formed in the other surface portion of the rotary valve 11. Further, an enclosing chamber 14, whose opening is closed by a plug 18, is formed in the rotary valve 11. Moreover, a ball valve 15 is enclosed in the enclosing chamber 14. The enclosing chamber 14 communicates with the high-pressure chamber 12 through an orifice 16. The ball valve 15 is pressed by a spring 17 against an aperture thereof communicating with the orifice 16. Further, a discharge port 19 is drilled through the rotary valve 11 in such a way as to communicate with the enclosing chamber 14, for the purpose of relieving the internal oil pressure of the enclosing chamber 14. When there is substantially no rotational-speed difference between the two drive shafts, the spring 17 presses the ball valve 15 against the aperture of the orifice 16, so that the orifice 16 is closed. When the rotational-speed difference therebetween increases and thus the internal oil pressure of the high-pressure chamber 12 rises to a value equal to or higher than the predetermined value, the ball valve 15 moves against a force exerted by the spring 17 and opens the orifice 16. At that time, the torque characteristics become the characteristic as illustrated in FIG. 8, so that an initial torque can be increased by a torque g.

Further, various torque characteristics are required for this hydraulic power transmission joint to improve the performance of a vehicle. The combination of an increased-initial-torque characteristic as illustrated in FIG. 8 and a two-stage torque characteristic as illustrated in FIG. 9 is required for improving, for example, the stability or road-holding of a vehicle running on what is called a low-$\mu$ road surface, the coefficient of friction of which is low. Further, an automatic lock torque characteristic as illustrated in FIG. 6 is required for enhancing the road ability of the vehicle. Moreover, the torque limiter characteristic (namely, the torque characteristics Df a torque limiter) as illustrated in FIG. 10 is required for reducing the size and weight of a power train system.

However, although the conventional valve mechanism for controlling the torque characteristics can obtain the automatic lock characteristic of FIG. 6 and the increased-initial-torque characteristic of FIG. 8, each of such characteristics can be obtained only as a separate characteristic. Further, the conventional valve mechanism can obtain neither the second-stage torque characteristic of FIG. 9 nor the torque limiter characteristic of FIG. 10. Moreover, the torque characteristic of FIG. 11 acting as the combination of the automatic lock torque characteristic and the increased-initial-torque characteristic cannot be obtained. Furthermore, a valve structure for obtaining the automatic lock torque characteristic of FIG. 6 becomes complex as illustrated in FIG. 2. Thus, there has been a problem that the manufacturing cost is increased.

Further, in the case of the valve structure of FIGS. 1 and 2 for realizing the automatic lock characteristic or performance, the gap between the pin 4 and the hole, into which the pin 4 is inserted, is set to be small in order to maintain the internal oil pressure of the high-pressure chamber 2. Thus, there has been a problem that the gap formed therebetween is clogged with foreign particles-contained in oil and as a result, the pin 4 comes to be unable to move. Moreover, it is difficult owing to the small diameter of this hole to secure the accuracy. Furthermore, the ball valve 3 blocks the orifice 10 to thereby lock the rotary valve. At that time, the ball valve 3 strikes hard against an aperture portion of the orifice 10. Thus, there has been a problem that in such a case, the aperture portion of the orifice 10 often brakes and consequently, the orifice cannot be closed by the ball valve 3. Especially, the rotary valve 1, in which the orifice 10 is formed, is made of a sintered material. Therefore, the hardening of the rotary valve to be performed by utilizing a heat treatment or the like for facilitating the working thereof cannot be implemented. Thus the orifice 10 is liable to be broken by a collision thereof with the ball valve 3. To solve this problem, a hard material may be used as the material of the rotary valve 1. However, in this case, the working of such a rotary valve is difficult. Consequently, the manufacturing cost thereof is increased.

SUMMARY OF THE INVENTION

In accordance with the present invention, there is provided a hydraulic power transmission joint for transmitting a torque according to a difference between the rotational speeds of both of power rotary shafts (or drive shafts). This hydraulic power transmission joint has a fundamental structure which comprises: a cam housing which is provided between input and output shafts being capable of performing a relative rotation and is connected to one of the shafts and has a cam face having two or more cam noses formed on the inside surface thereof; a rotor connected to the other of the shafts and rotatably enclosed in the cam housing, in which a plurality of plunger chambers are formed in the direction of an axis thereof; a plurality of plungers which are enclosed in the plurality of plunger chambers, respectively, in such a manner as to be able to perform a reciprocative movement by the pressing force of a corresponding return spring and are driven by the cam face when a relative rotation of one of the shafts with respect to the other thereof; intake/discharge holes which are formed in the rotor and communicate with the plunger chambers; and a rotary valve which is rotatably and slidably brought into contact with an end surface of the rotor and is positioned in such a way as to have a positional relation with the cam housing and has a plurality of intake and discharge ports that are formed in the surface portions thereof and act as intake and discharge valves, respectively, according to the positional relation thereof with the intake/discharge holes; and an orifice for generating fluid resistance by the flow of discharge oil caused by driving the plungers.

In the case of such a hydraulic power transmission joint, in accordance with a first aspect of the present invention, there is provided a hydraulic power transmission joint provided with a simple valve structure for realizing an automatic lock characteristic according to an oil pressure supplied from a discharge port. In this valve structure for obtaining the automatic lock characteristic, a first enclosing hole is formed in the rotary valve. Further, in this enclosing hole, a first spool valve, a first spring for pressing the first spool valve, and a first pin (member) adapted to be caused by the first spool valve to move are provided. Furthermore, a first communicating hole, which communicates with a high-pressure chamber, is provided in a first-spool-valve-side portion thereof. Moreover, a second communicating hole, which communicates with a low-pressure chamber, is provided in a first-pin-member-side portion thereof. The valve structure has a second enclosing hole which is formed in the rotary valve and has a diameter smaller than that of the first enclosing hole. In the second enclosing hole, a second spool valve having a diameter smaller than that of the first spool valve, a second spring to be compressed by the movement of the second spool valve, a second pin member for stopping the movement of the second spool valve, a third communicating hole which communicates with the low-pressure chamber and is formed in a second-spool-valve-side portion thereof, a fourth communicating hole which communicates with the high-pressure chamber and is formed in a second-pin-member-side portion thereof, and an orifice which is provided between the third and fourth communicating holes and is adapted to be closed by the movement of the second spool valve.

In accordance with a second aspect of the present invention, there is provided a power transmission joint having a valve structure for realizing a torque characteristic that a torque increasing according to the oil pressure supplied from the discharge port is limited to a prescribed torque. This valve structure for realizing the torque characteristics of this limiter is obtained by adding a fifth communicating hole, which communicates with the low-pressure chamber and is provided between the first and second communicating holes, to the valve structure of the first aspect of the present invention.

In accordance with a third aspect of the present invention, there is provided a power transmission joint having a valve structure for realizing the combination of a torque characteristic that an initial torque is upped or increased according to the oil pressure supplied from the discharge port, and an automatic lock characteristic. In this valve structure for realizing the combination of a torque characteristic that an initial torque is upped or increased according to the oil pressure supplied from the discharge port, and an automatic lock characteristic, a first enclosing hole is formed in the rotary valve. Further, in this first enclosing hole, a first spool valve having first and second large-diameter portions, a first spring for pressing the first spool valve, and a first pin member adapted to be caused by the first spool valve to move are provided. Furthermore, a first communicating hole, which communicates with a high-pressure chamber, is provided in a first-spool-valve-side portion thereof. Moreover, a second communicating hole, which communicates with a low-pressure chamber, is provided in a firstpin-member-side portion thereof. Additionally, a sixth communicating hole, which communicates with the high-pressure chamber, is provided between the first and second large-diameter portions and an orifice for generating fluid resistance, which is first closed by the first large-diameter portion and subsequently, is closed by the second large-diameter portion as a result of the movement of the first spool valve, are provided in the first enclosing hole. The valve structure has a second enclosing hole which is formed in the rotary valve and has a diameter smaller than that of the first enclosing hole. In the second enclosing hole, a second spool valve having a diameter smaller than that of the first spool valve, a second spring to be compressed by the movement of the second spool valve, a second pin member for stopping the movement of the second spool valve, a third communicating hole which communicates with the low-pressure chamber and is formed in a second-spool-valve-side portion thereof, a fourth communicating hole which communicates with the high-pressure chamber and is formed in a second-pin-member-side portion thereof, and an orifice which is provided between the third and fourth communicating holes and is adapted to be closed by the movement of the second spool valve.

In accordance with a fourth aspect of the present invention, there is provided a power transmission joint having a valve structure for achieving a two-stage change in a torque characteristic according to the oil pressure supplied from the discharge port. This valve structure for achieving the two-stage change in a torque characteristic is obtained by eliminating the second large-diameter portion and the sixth communicating hole of the spool valve from and adding an orifice for generating fluid resistance, which is always opens, between the third and fourth communicating holes to the valve structure of the third aspect of the present invention.

In accordance with a fifth aspect of the present invention, there is provided a power transmission joint having a valve structure for realizing the combination of a toque characteristic that an initial-torque is increased according to the oil pressure supplied from the discharge port, and a torque characteristic that the torque is limited by a limiter. This valve structure for realizing the combination of a toque characteristic that an initial-torque is increased according to the oil pressure supplied from the discharge port, and a torque characteristic that the torque is limited by a limiter is obtained by adding a fifth communicating hole which communicates with the low-pressure chamber as a result of the first spool valve and is provided between the first and sixth communicating holes, to the valve structure of the third aspect of the present invention and by increasing the size of the second large-diameter portion in the direction of the axis of the first spool valve.

In accordance with a sixth aspect of the present invention, there is provided a hydraulic power transmission joint having a valve structure for realizing an automatic lock torque characteristic, by which the valve can be prevented from being stuck by foreign particles having been contained in oil and having adhered to the valve, and by which the endurance of the joint against a shock caused by the closing of the ball valve when locked is enhanced. This valve structure has a valve element, which has a position to be controlled and enclosed in the high-pressure chamber formed in the rotary valve, and a gap between a pin holding the valve element and a communicating hole, which providing communication from the high-pressure chamber to an enclosing hole for enclosing the pin therein, is formed as an orifice for generating fluid resistance. Thereby, the gap between the communicating hole and the pin is increased. Consequently, the pin can be prevented from being stuck by foreign particles having been contained in oil and having adhered to the valve. Further, the diameter of the hole can be increased. Thus, the accuracy of working of the hole may be rough accuracy. Consequently, the working of the hole can be facilitated. Moreover, in the case of this valve structure, a collar member, on which a valve seat being made of a hard material and communicating with the orifice, is provided in the high-pressure chamber. Furthermore, the valve element is movably enclosed in the collar member.

Further, in accordance with a seventh aspect of the present invention, there is provided a hydraulic power transmission joint having a valve structure for realizing, by which the valve is prevented from being stuck owing to foreign particles which have been contained in oil and have adhered thereto, and by which the endurance of the joint against a shock caused by the closing of the ball valve when locked is enhanced. Moreover, in the case of this valve structure, a valve element, which is held at a releasing position by the pin in a normal period when the oil pressure is less than a prescribed value, and which is released from the pin and becomes free when the oil pressure is equal to or higher than the prescribed value, is enclosed and a collar member made of a hard material having an orifice for generating fluid resistance, on which the valve element having become free is seated, are provided in the high-pressure chamber formed in the rotary valve.

Other features, objects and advantages of the present invention will become apparent from the following description of preferred embodiments with reference to the drawings in which like reference characters designate like or corresponding parts throughout several views.

BRIEF DESCRIPTION OF THE DRAWINGS

FIG. 1 is a diagram for illustrating the structure of the conventional joint for obtaining the automatic lock characteristic;

FIG. 2 is a sectional diagram taken on line II—II of FIG. 1;

FIG. 3 is a diagram for illustrating the conventional joint when being in an automatic lock state;

FIG. 4 is a sectional diagram taken on line IV—IV of FIG. 3;

FIG. 30 is a sectional diagram for illustrating the structure of a valve of a sixth embodiment of the present invention;

DETAILED DESCRIPTION OF THE PREFERRED EMBODIMENTS

Hereinafter, the preferred embodiments of the present invention will be described in detail by referring to the accompanying drawings.

Figure 12:
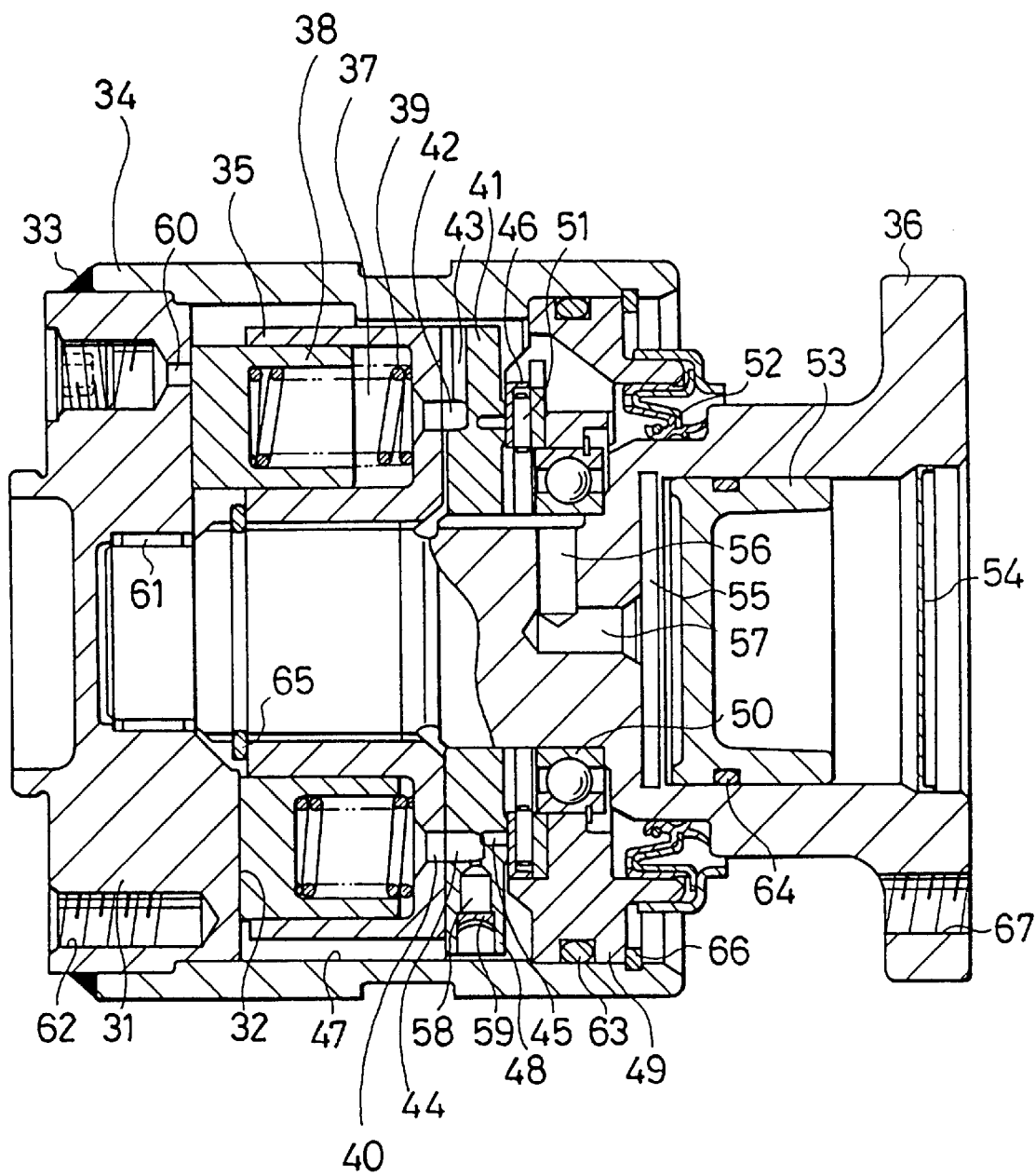
FIG. 12 is a sectional diagram for illustrating a joint of the present invention.

FIG. 12 is a sectional diagram for illustrating a power transmission joint of the present invention. A cam 31 is enclosed in a cam housing 34. The cam 31 has a cam face 32 having two cam noses formed on the inside surface thereof. Further, the cam 31 is connected to an output shaft (not shown) through a threaded hole 62 and rotate together with the output shaft as one body. Moreover, the cam 31 is fixed to the cam housing 34 at a weld 33, so that the cam 31 and the cam housing 34 rotate as one body. A rotor 35 is rotatably enclosed in the cam housing 34 and is connected to an input shaft 36. Thus the rotor 35 and the input shaft 36 rotate as one body. A plurality of plunger chambers 37 are formed in the rotor 35 in the direction of the center axis of the shaft. Plungers 38 are slidably enclosed in the plunger chambers 37 through return springs 39, respectively. Further, a plurality of intake/discharge holes 40 are formed in the rotor 35 in such a way as to communicate with the plunger chambers 37, respectively. Intake ports 42, intake passages 43 and discharge ports 44 are formed in the front surface portion of a rotary valve 41. Further, communicating grooves 45, which communicate with the discharge ports 44, are formed in the back surface portion of the rotary valve 41. Further, a cover member 46 is provided very close to the back surface of the rotary valve 41 and closes the communicating grooves 45. The rotary valve 41 has positioning projections 48 to be engaged with notches 47 formed in the inner circumferential surface portion of the cam housing 34. The rotary valve 41 is a timing member for determining an open/close timing of the intake/discharge holes 40. The notches 47 and the projections 48 compose a portioning mechanism for restricting the positional relation between the cam 31 and the rotary valve 41. In the case of a leftward or intake stroke of the plungers 38, the intake port 42 of the rotary valve 41 comes to communicate with the intake/discharge hole 40 of the rotor 35. Thus, oil can be taken into the plunger chambers 37 through orifices, the intake ports 42, the intake passages 43 and the intake/discharge hole 40 of the rotor 35 (to be described later). In contrast, in the case of a rightward or discharge stroke of the plungers 38, which is the reverse of the intake stroke thereof, the intake/discharge hole 40 of the rotor 35 comes to communicate with the communicating grooves 45 through the discharge ports 44 of the rotary valve 41.

A bearing retainer 49 and the cam housing 34 rotate as one body. Further, the bearing retainer 49 supports the input shaft 36 through a bearing 50. A thrust needle bearing 51 intervenes between the bearing retainer 49 and the rotary valve 41. The friction torque between this thrust needle bearing 51 and the valve 41 (or the retainer 49) is set in such a way as to be smaller than the friction torque between the rotor 35 and the rotary valve 41. Therefore, when the direction of the differential rotation changes, the rotary valve 41 and the rotor 35 rotate in the opposite directions by drag (namely, resistance caused by friction). When the rotary valve 41 rotates by drag until the positioning projection 48 touches the notch 47, the rotary valve 41 and the cam housing 34 rotate as one body thereafter. Thereby, either when normally rotates, or when reversed, the intake/discharge hole 40 is opened/closed forcibly. An oil seal 52 is provided between the bearing retainer 49 and the input shaft 36. Further, an accumulator piston 53 for absorbing the thermal expansion/heat contraction is slidably enclosed in the input shaft 36. A lid member 54 prevents muddy water from entering an accumulator chamber 55. The accumulator chamber 55 communicates with the inside of the joint through oil passages 56 and 57. A high-pressure chamber 58, which communicates with the discharge ports 44 is formed in the rotary valve 41. An exit portion of the high-pressure chamber 58 is closed by a plug 59. Incidentally, reference numeral 60 designates a lubricating hole; 61 a needle bearing; 62 a threaded hole; 63 and 64 O-rings; 65 and 66 snap rings; and 67 a mounting hole.

Figure 13:
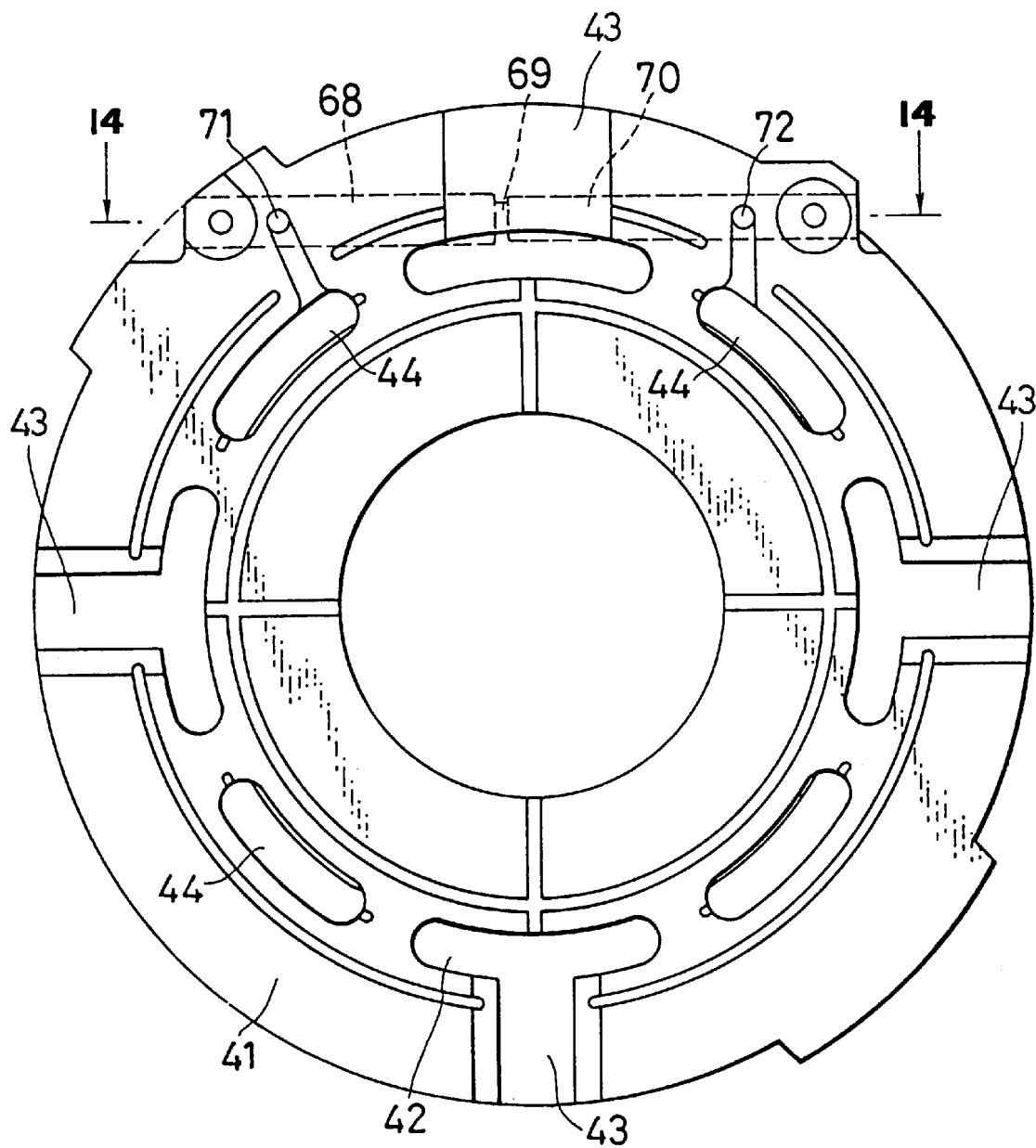
FIG. 13 is a front view of a rotary valve of FIG. 12.

FIG. 13 is a front view of the rotary valve 41 of FIG. 12. For example, the four intake ports 42 and the four discharge ports 44 are formed alternately on the surface of the rotary valve 41 in the circumferential direction thereof. The intake passages 43 communicate with the intake ports 42, respectively. A torque controlling valve structure for realizing an automatic lock torque characteristic, which is a first embodiment of the present invention, is provided on the top portion of this rotary valve 41, as indicated by dashed lines in FIG. 13. Namely, a first enclosing hole 68 is bored in the rotary valve 41. Further, a second enclosing hole 70, which communicates with the first enclosing hole 68 through a communicating portion 69, is bored therein. Further, the second enclosing hole 70 is formed in such a way as to have a diameter smaller than that of the first enclosing hole 68. The first enclosing hole 68 communicates with the discharge ports 44. The second enclosing hole 70 communicates with the discharge ports 44 through a fourth communicating hole 72.

Figure 14:
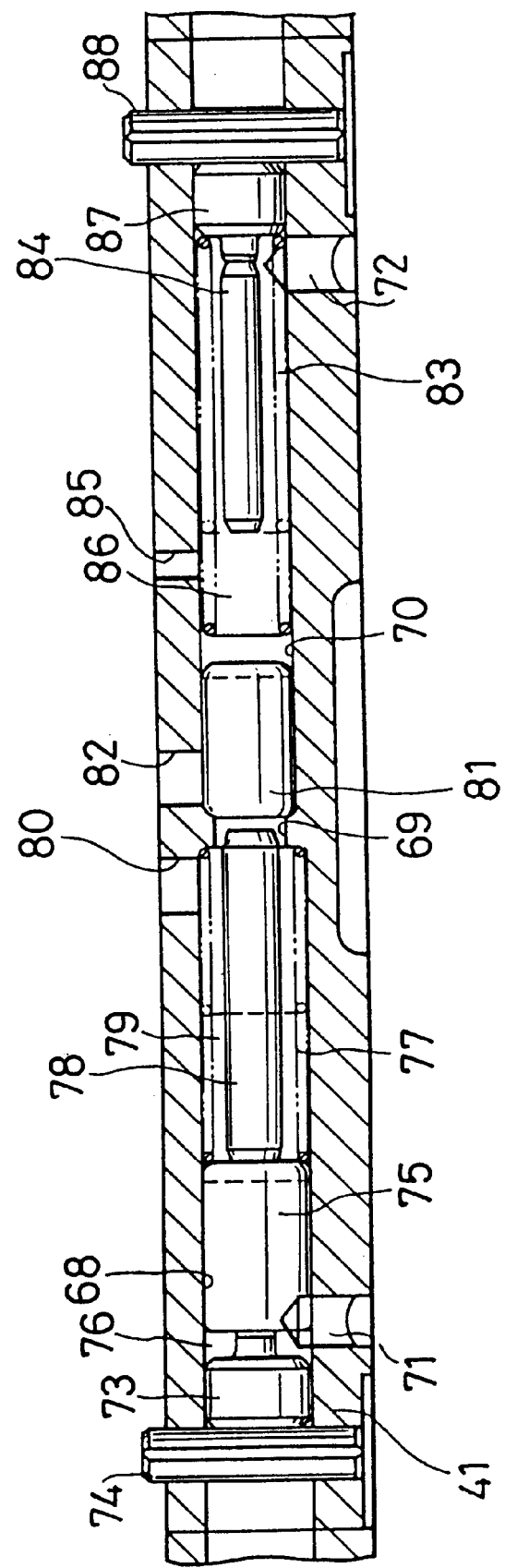
FIG. 14 is a sectional diagram for illustrating the structure of a valve of a first embodiment of the present invention.

FIG. 14 is a sectional diagram for illustrating the valve structure of the first embodiment of the present invention, which is taken on line 14—14 of FIG. 13. The torque controlling valve has the first enclosing hole 68 which is closed by a stopper pin 74 through a seal member 73. A first spool valve 75 is movably enclosed in the first enclosing hole 68. A first high-pressure chamber 76 is formed between the first spool valve 75 and the seal member 73. The first high-pressure chamber 76 communicates with the discharge port 44 through the first communicating hole 71. Thereby, a high pressure is supplied thereto. A first spring 77 intervenes between the spool valve 75 and the inner wall of the first enclosing hole 68 and presses the first spool valve 75 leftwardly. A first pin member 78 is also enclosed in the first enclosing hole 68 in such a manner as to be adjacent to the first spool valve 75. The first pin member 78 has an end pressed by the first spool valve 75 and further has another end slidably supported by the communicating portion 69. A first low-pressure chamber 79 is formed in the first enclosing hole 68 in which the first pin member 78 and the first spring 77 are enclosed. The first low-pressure chamber 79 communicates with a lower-pressure portion, which leads to the intake port 42, through a second communicating hole 80. Subsequently to the first enclosing hole 68, the second enclosing hole 70 is formed therein in such a way as to be coaxial with the first enclosing hole 68. A second spool valve 81, which is smaller than the first spool valve 75 in diameter, is movably enclosed in the second enclosing hole 70. The second spool valve 81 is pressed by the first pin member 78 and thus can be moved rightwardly, as viewed in this figure. The second enclosing hole 70 has a third communicating hole 82 as an opening thereof. The third communicating hole 82 communicates with the low-pressure chamber. Further, a second spring 83 is enclosed in the second enclosing hole 70. Moreover, a second pin member 84 is enclosed in the second spring 83. The second spring 83 is compressed by the movement of the second spool valve 81. The second pin member 84 hinders the second spool valve 81 from moving. The second enclosing hole 70 has an orifice 85 for generating fluid resistance, which communicates with the low-pressure chamber, as an opening thereof. The orifice 85 is closed by the movement of the second spool valve 81. A second high-pressure chamber 86 is formed in the second enclosing hole 70 in which the second spring 83 and the second pin member 84 are enclosed, on the right side of the second spool valve 81, as viewed in this figure. The second high-pressure chamber 86 communicates with the discharge port 44 through the fourth communicating hole 72. A high pressure is supplied from the discharge port 44 to a low-pressure portion through the fourth communicating hole 72, the second high-pressure chamber 86 and the orifice 85. At that time, the high pressure supplied from the discharge port 44 presses the second spool valve 81 leftwardly to thereby close the third communicating hole 82. The orifice 85 is formed to the left of the tip end of the second pin member 84, as viewed in this figure. When the second spool valve 81 is put into abutting engagement with the second pin member 84, the orifice 85 is completely closed. The second enclosing hole 70 is closed with a stopper pin 88 through a seal member 87.

Next, an operation of the valve structure of FIG. 14 will be described hereinbelow. If there occurs no difference between the rotational speeds of the cam 31 and the rotor 35 of FIG. 12, the plungers 38 do not operate. Thus the torque is not transmitted. At that time, the plungers 38 are pressed by the return springs 39 against the cam face 32. Next, if there occurs a difference between the rotational speeds of the cam 31 and the rotor 35, the plungers 38, which are in the middle of the discharge stroke, are axially pressed by the cam face 32 of the cam 31. At that time, the intake/discharge hole 40 communicates with the discharge ports 44. Thus, the plungers 38 push oil out of the plunger chambers 37 from the intake/discharge hole 40 to the discharge ports 44 of the rotary valve 41. The oil pushed out to the discharge ports 44 is supplied to the intake ports 42 through the fourth communicating hole 72, the second enclosing hole 70, the orifice 85 and the intake passages 43. At that time, the internal oil pressure of a region consisting of the second enclosing hole 70, the fourth communicating hole 72, the discharge ports 44 and the plunger chambers 37 is increased by the resistance occurring in the orifice 85. This results in the generation of reaction force in the plungers 38. A torque is generated by rotating the cam 31 against the reaction force occurring in the plungers 38. Thereby, the torque is transmitted between the cam 31 and the rotor 35. Here, the discharge ports 44 communicate with one another through the communicating groove 45. Thus, all of the plunger chambers 37, which are in the middle of the discharge stroke, become equal to one another in internal oil pressure. If the cam 31 further rotates, an intake stroke is started. Thus, the intake/discharge hole 40 comes to communicate with the intake ports 42. The oil contained in the intake passage 43 is taken into the plunger chambers 37 through the intake ports 42 and the intake/discharge hole 40. Further, the plungers 38 return to initial positions along the cam face 32 of the cam 31.

Figure 15A:
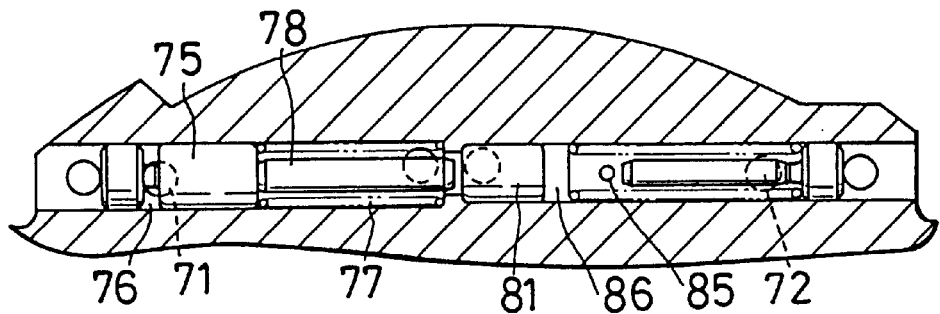
FIGS. 15A to 15D are diagrams for illustrating an operation of the first embodiment of the present invention.

FIGS. 15A to 15D are diagrams for illustrating an operation of the valve mechanism of FIG. 14. In the case that the differential revolving-speed (or rotational speed) $\Delta N$ is small and the oil pressure is not high, the oil pressure (namely, a pilot pressure) is supplied to the first high-pressure chamber 76 through the first communicating hole 71, as illustrated in FIG. 15A. At that time, the first spool valve 75 and the first pin member 78 are prevented by the first spring 77 and the second spool valve 81 from moving rightwardly, as viewed in this figure. On the other hand, the oil pressure is supplied to the second high-pressure 86 through the fourth communicating hole 72 presses the second spool valve 81 leftwardly. Moreover, the oil pressure is supplied to the low-pressure chamber through the orifice 85. Consequently, a torque characteristic indicated by a graph h of FIG. 16A is obtained.

Figure 15B:
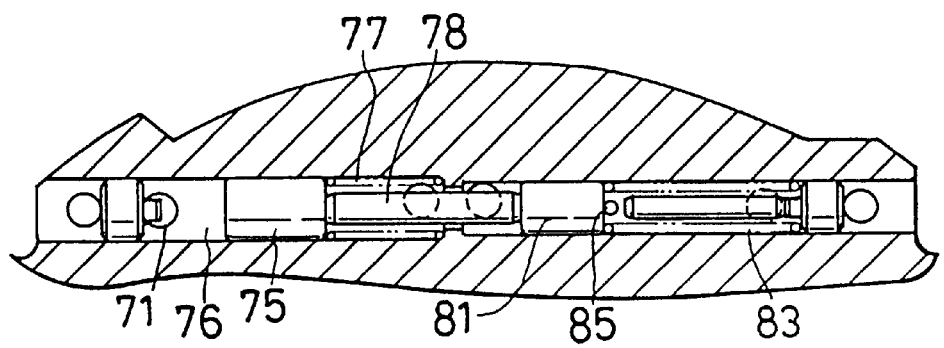
Figure 16A:
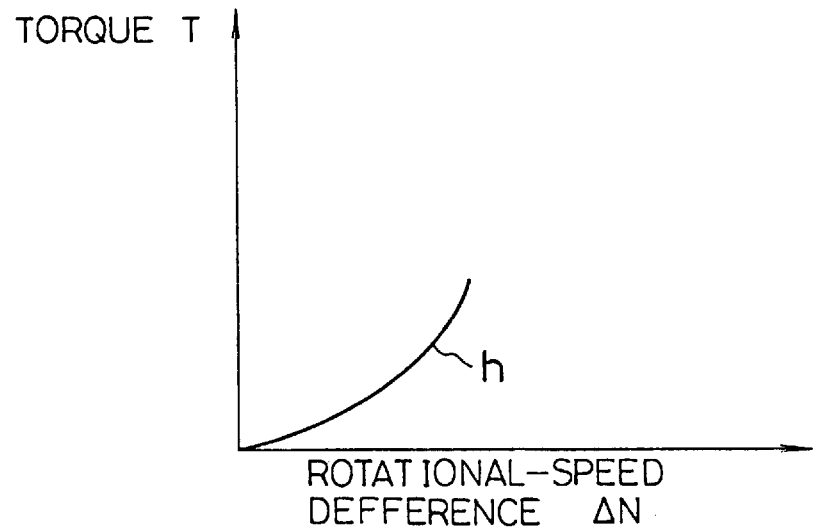
FIGS. 16A to 16C are diagrams for illustrating a torque characteristic of the first embodiment of the present invention.
Figure 16B:
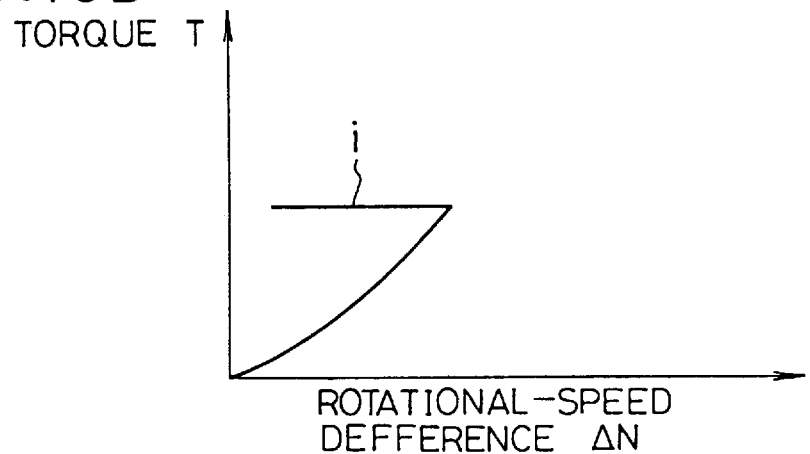

When the differential revolving-speed $\Delta N$ reaches a predetermined value and the oil pressure becomes equal to another predetermined value and the difference between a force exerted on the first spool valve 75 owing to the oil pressure and another force exerted on the second spool valve 81 becomes larger than the spring force or resilience of the first spring 77, the valve mechanism operates as illustrated in FIG. 15B. Namely, the oil pressure supplied to the first high-pressure chamber 76 through the first communicating hole 71 causes the first spool valve 75 to move rightwardly against the force of the first spring 77. The first pin member 78 is pressed by the first spool valve 75 and thus moves rightwardly and presses the second spool valve 81 until the first pin member 78 touches the second spring 83. When the oil pressure becomes further higher and the difference between the force exerted on the first spool valve 75 owing to the oil pressure and the force exerted on the second spool valve 81 becomes larger than a sum of the spring forces of the first spring 77 and the second spring 83, the second spool valve 81 starts closing the orifice 85. Thus a lock operation is commenced. At that time, a torque characteristic indicated by a graph i of FIG. 16B is obtained.

Figure 15C:
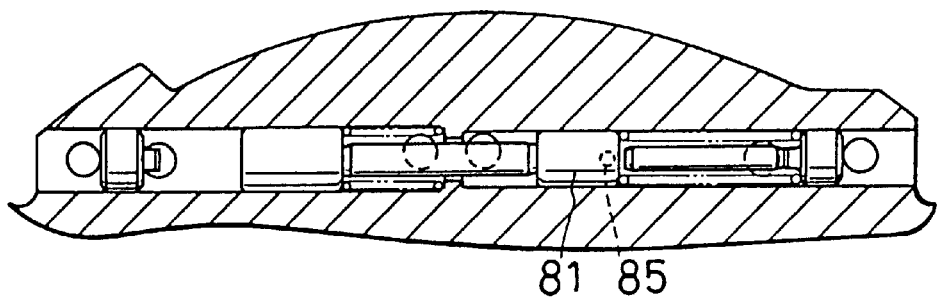
Figure 15D:
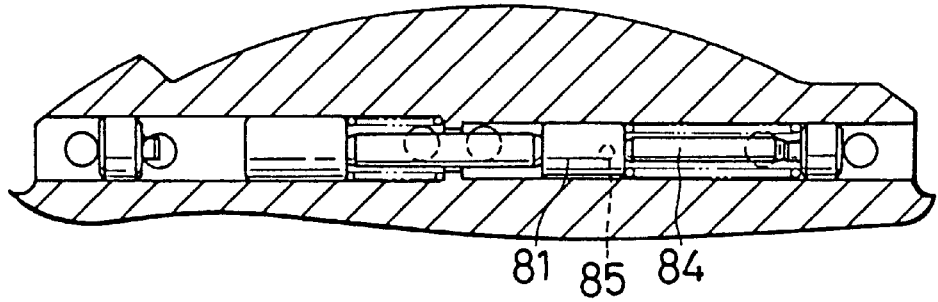
Figure 16C:
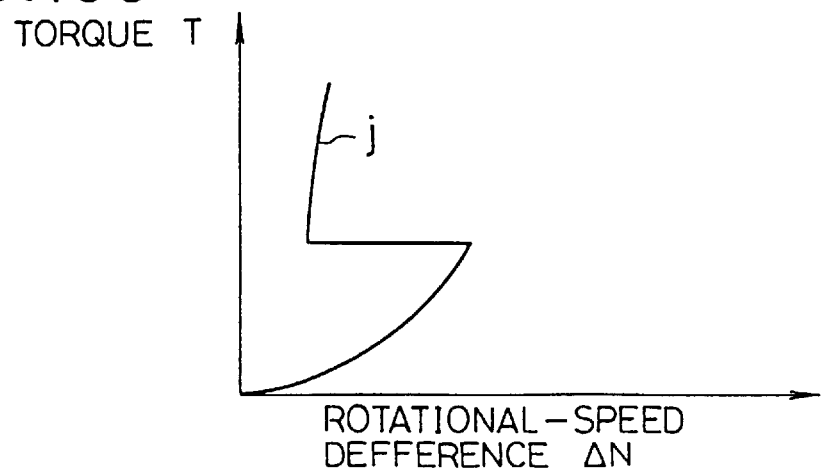

When the oil pressure becomes further higher, the second spool valve 81 moves further rightwardly as shown in FIG. 15C. Thus the orifice 85 is completely closed. Thereby, the lock operation is completed. If the second spool valve 81 moves further rightwardly, the second spool valve 81 is brought into abutting engagement with the second pin member 84, as shown in FIG. 15D. Thereby, the movement of the second spool valve 81 can be blocked. This state is what is called a bottoming state. A torque characteristic posterior to the completion of the lock operation, which is represented by a graph j of FIG. 16C, is obtained, subsequent to the characteristic at the time of starting the lock operation. With a simple structure of FIG. 14, the automatic lock torque characteristic of FIG. 16C for enhancing the ability of running a bad road can be obtained.

Figure 17:
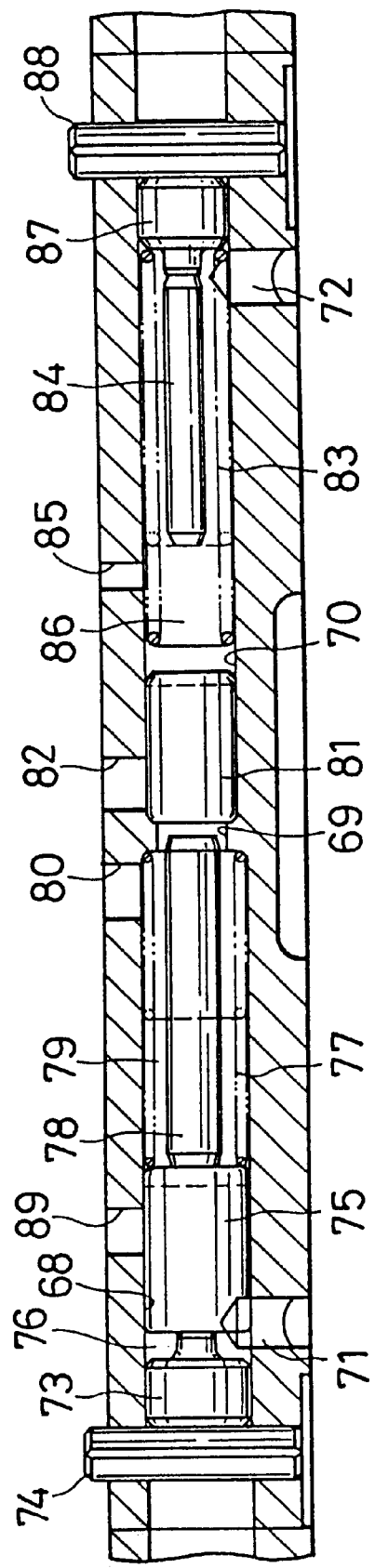
FIG. 17 is a sectional diagram for illustrating the structure of a valve of a second embodiment of the present invention.

FIG. 17 is a sectional diagram for illustrating the valve structure of a second embodiment of the present invention A torque characteristic of a torque limiter for reducing the size and weight of a power train system can be obtained by employing this valve structure. This valve structure is obtained by newly providing a fifth communicating hole 89, which is an opening of the first enclosing hole 68, in the valve structure of the first embodiment of FIG. 14. This fifth communicating hole 89 is formed between the first communicating hole 71 and the second communicating hole 80. The fifth communicating hole 89 communicates with the low-pressure chamber. Thus the internal oil pressure of the first high-pressure chamber 76 is relieved to the low-pressure chamber. Namely, in an initial condition in which the oil pressure is low, the fifth communicating hole 89 is closed with the first spool valve 75. When the oil pressure reaches a predetermined value, the fifth communicating hole 89 is opened by the first spool valve 75 and comes to communicate with the first high-pressure chamber 76. The remaining portion of the valve structure is the same as of the first embodiment of FIG. 14.

Figure 18A:
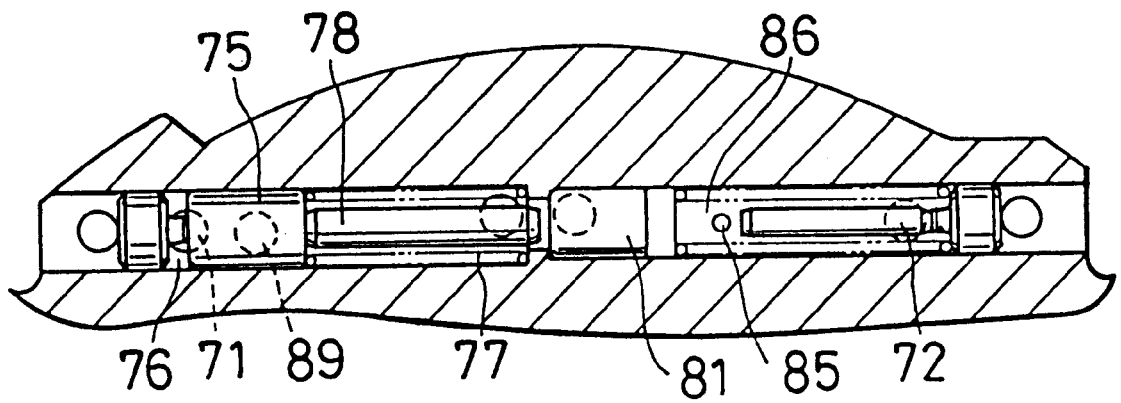
FIGS. 18A and 18B are diagrams for illustrating an operation of the second embodiment of the present invention.
Figure 19A:
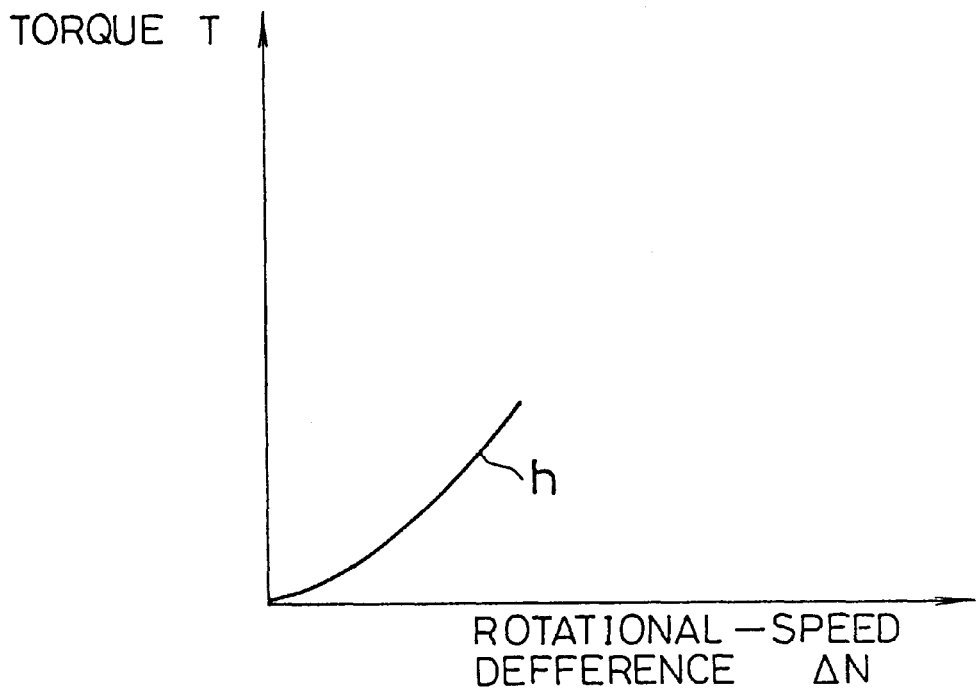
FIGS. 19A and 19B are diagrams for illustrating a torque characteristic of the second embodiment of the present invention.

Hereinafter, an operation of the second embodiment will be described. In an initial condition in which the differential revolving-speed ΔN is small and the oil pressure reaches a predetermined value, the pilot oil pressure is supplied to the first high-pressure chamber 76 through the first communicating hole 71 as illustrated in FIG. 18A. The first spool valve 75 and the first pin member 78 do not move rightwardly owing to the presence of the first spring 77 and the second spool valve 81. simultaneously, the oil pressure is supplied to the second high-pressure chamber 86 through the fourth communicating hole 72. This oil pressure causes the second spool valve 81 to move leftwardly. Further, this oil pressure is supplied to the low-pressure chamber through the orifice 85. In this initial condition, the fifth communicating hole 89 is closed with the first spool valve 75. Thus, a torque characteristic represented by a graph h of FIG. 19A is realized.

Figure 18B:
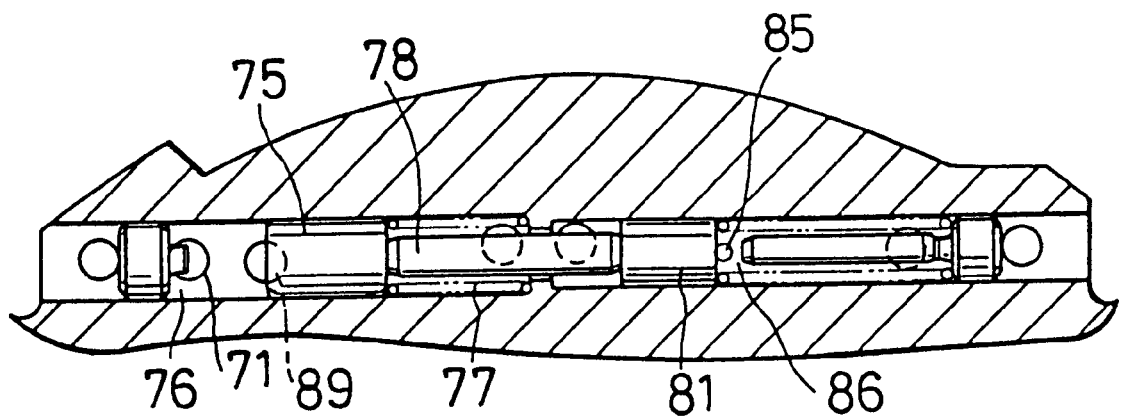
Figure 19B:
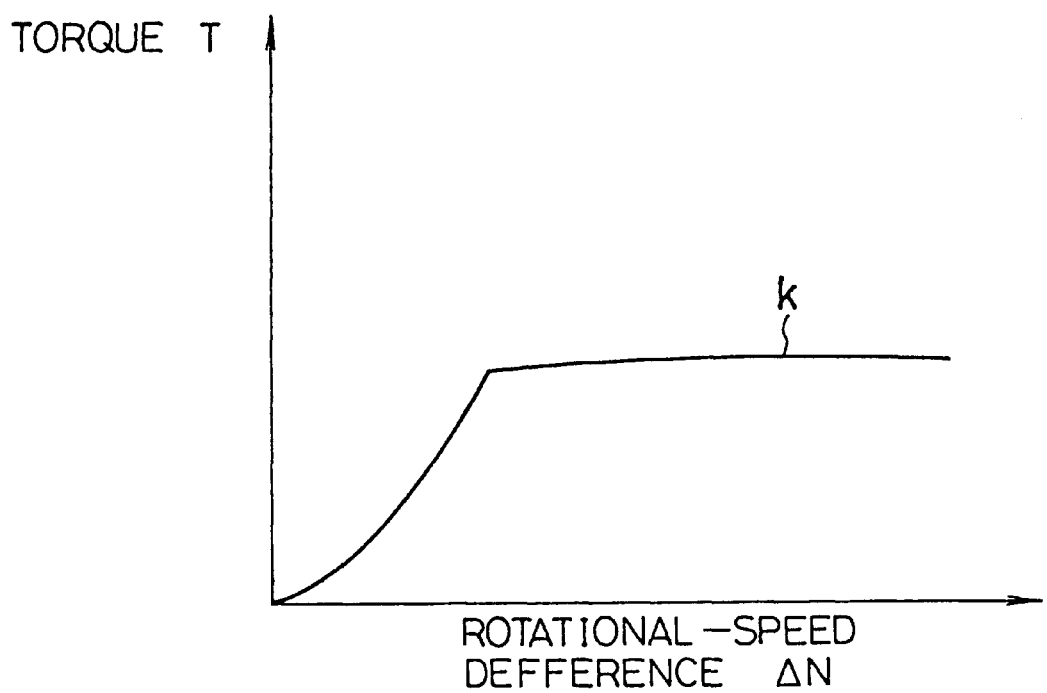

Next, when the differential revolving-speed ΔN becomes large and the oil pressure becomes equal to a predetermined value and the difference between a force exerted on the first spool valve 75 owing to the oil pressure and another force exerted on the second spool valve 81 becomes Larger than the force of the first spring 77, the valve mechanism operates as illustrated in FIG. 18B. Namely, the first spool valve 75 moves rightwardly against the force of the first spring 77. The first pin member 78 presses the second spool valve 81 rightwardly. When the first spool valve 75 moves rightwardly, the fifth communicating hole 89 starts opening. Thereby, the oil pressure is relieved to the low-pressure chamber. When the internal oil pressure of the first high-pressure chamber 76 thus lowers, the first spool valve 75 moves leftwardly to thereby close the fifth communicating hole 89. Further, when the second spool valve 81 closes the orifice 85, the internal oil pressure of the second high-pressure chamber 86 increases and thus the second spool valve 81 moves leftwardly and opens the orifice 85 again. The torque characteristic of a torque limiter, which is represented by a graph k of FIG. 19B, is obtained by performing such a pressure regulating operation. Thus, the second embodiment of FIG. 17 canleasily obtain the torque characteristic of a torque limiter by adding only the fifth communicating hole 89 to the first embodiment of FIG. 14.

Figure 20:
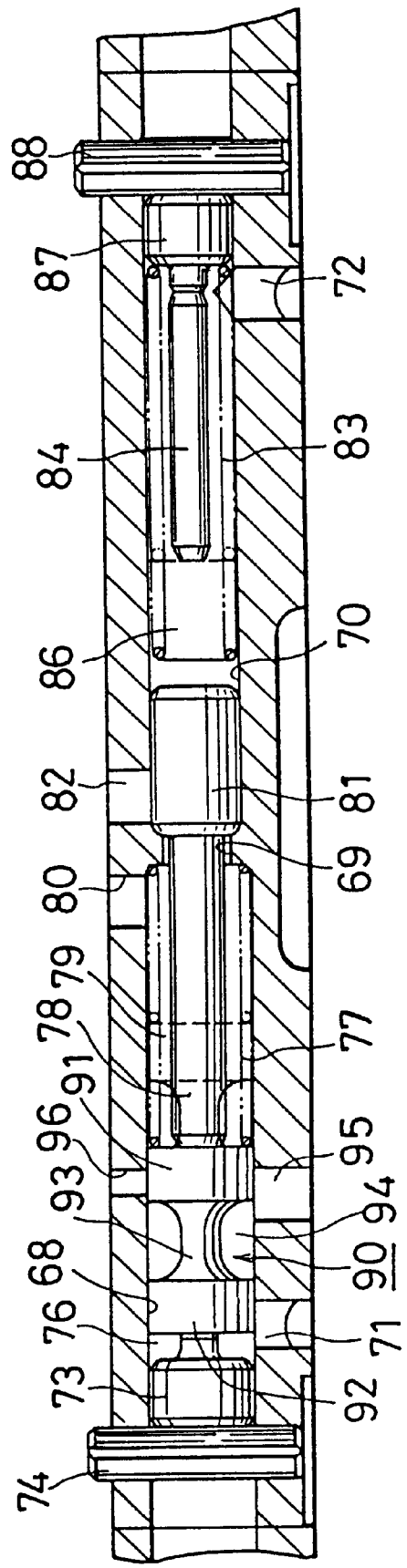
FIG. 20 is a sectional diagram for illustrating the structure of a valve of a third embodiment of the present invention.
Figure 21:
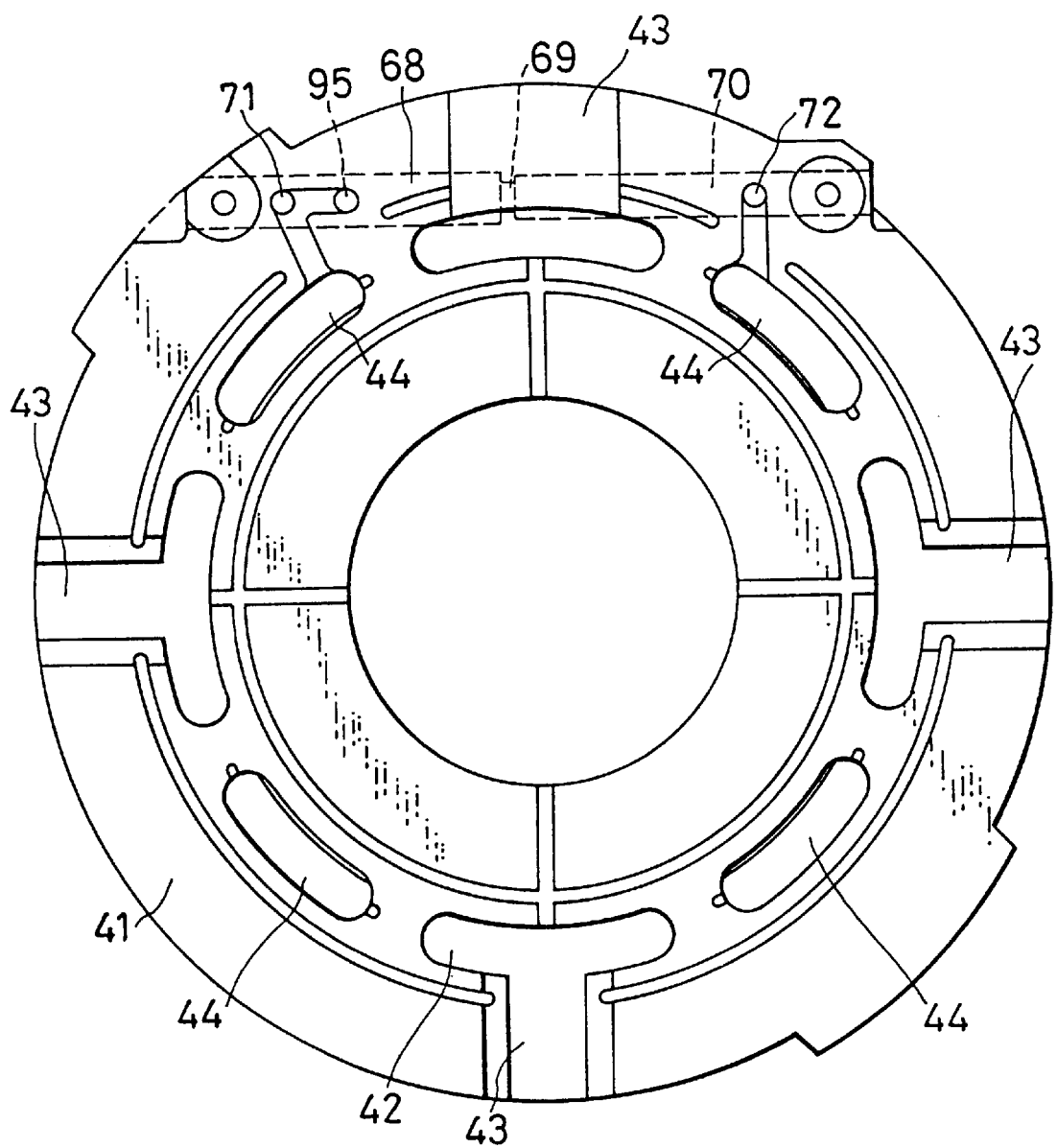
FIG. 21 is a front view of a rotary valve of the third embodiment of the present invention.

FIG. 20 illustrates the structure of the valve of the third embodiment of the present invention. A torque characteristic to be realized by combining the increased-initial-torque characteristic with an automatic lock torque characteristic is obtained by employing this valve structure. A first spool valve 90 is enclosed in the first enclosing hole 68. The first spool valve 90 has a first large-diameter portion 91, a second large-diameter portion 92 and a small-diameter portion 93 for connecting these large-diameter portions. A third high-pressure chamber 94 is formed between the first large-diameter portion 91 and the second large-diameter portion 92. The third high-pressure chamber 94 has a sixth communicating hole 95 as an opening thereof. As illustrated in FIG. 21, in the rotary valve, the sixth communicating hole 95 communicates with the discharge ports 44. Thus the oil pressure is supplied to the third high-pressure chamber 94. An orifice 96 for generating fluid resistance is formed almost in the other side portion of the sixth communicating hole 95. The rest of this valve structure is the same as of the first embodiment of FIG. 14.

Figure 22A:
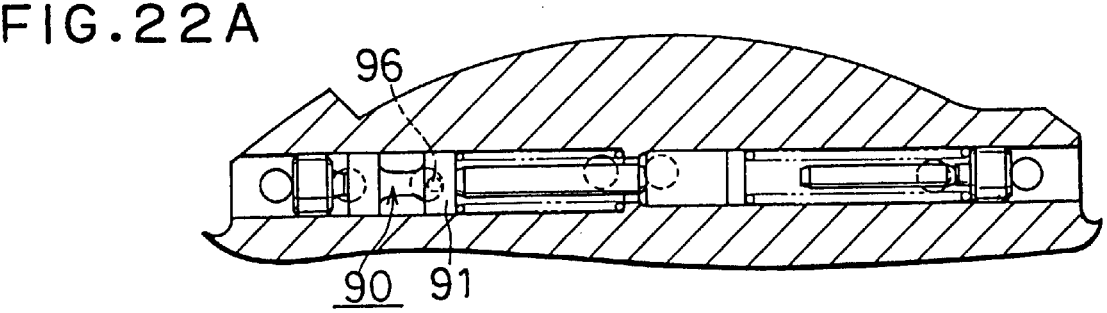
FIGS. 22A to 22E are diagrams for illustrating an operation of the third embodiment of the present invention.
Figure 22B:
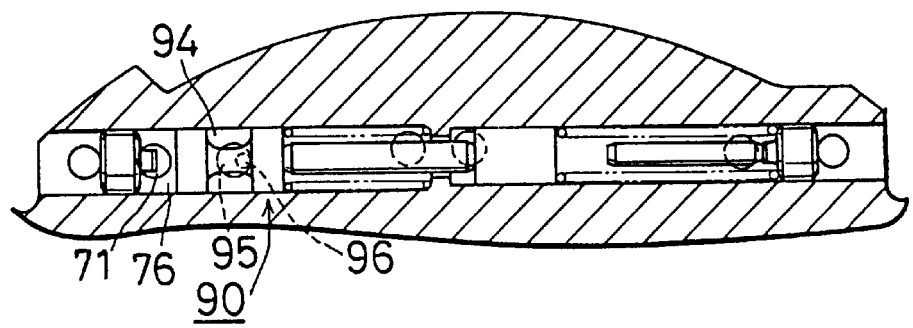
Figure 22C:
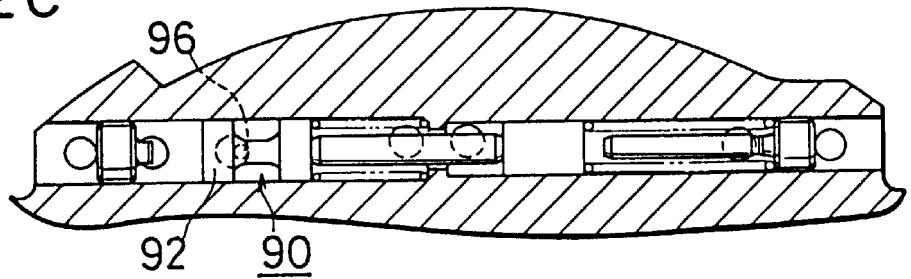
Figure 22D:
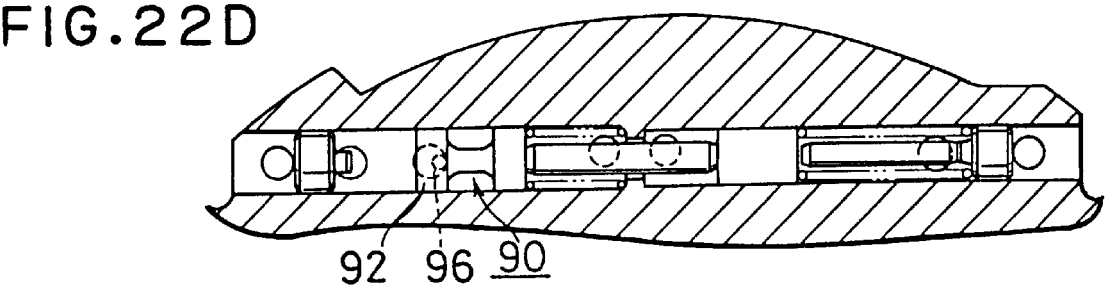
Figure 22E:
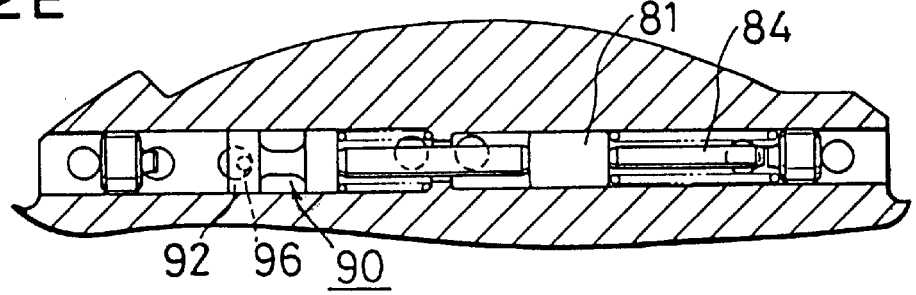
Figure 23A:
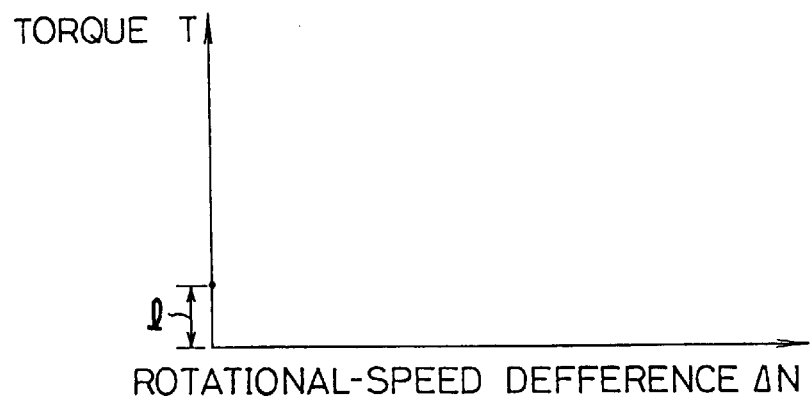
FIGS. 23A to 23D are diagrams for illustrating a torque characteristic of the third embodiment of the present invention.
Figure 23B:
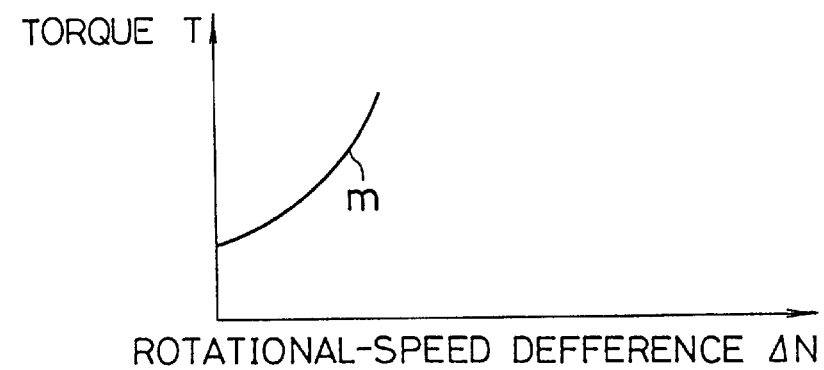
Figure 23C:
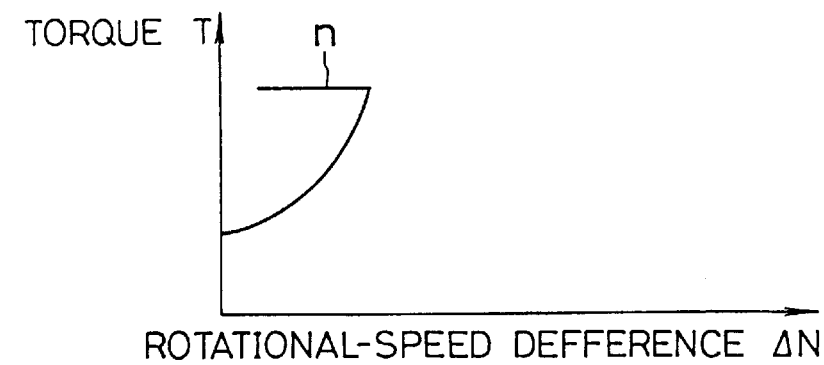
Figure 23D:
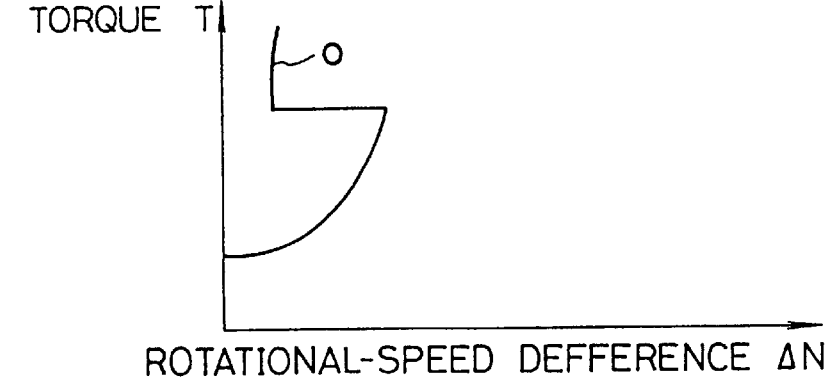

Hereinafter, an operation of the third embodiment of FIG. 20 will be described. The first large-diameter 91 is formed in such a manner as to have an axial length larger than the diameter of the orifice 96. In an initial condition before the oil pressure reaches a predetermined value, the orifice 96 is closed by the first large-diameter portion 91. When the first spool valve 90 moves rightwardly as a result of a rise in oil pressure, the orifice 96 communicates with the high-pressure chamber 94. If the first spool valve 90 moves further rightwardly, the orifice 96 is closed with the second large-diameter portion 92. Namely, in an initial state before the oil pressure reaches a predetermined value, the first spool valve 90 does not move as illustrated in FIG. 22A. Further, the orifice 96 is closed with the first large-diameter portion 91. Therefore, a torque characteristic l of FIG. 23A, in which an initial torque is upped or increased, is obtained. When the oil pressure increases further higher, the oil pressures supplied to the first high-pressure chamber 76 and the third high-pressure chamber 94 cause the first spool valve 90 to move rightwardly against the spring, the orifice 98 is released as illustrated in FIG. 22B. Namely, the orifice 96 communicates with the third high-pressure chamber 94. Upon completion of this orifice 96, the torque characteristic represented by a graph m of FIG. 23B is obtained. When the oil pressure becomes further higher, the first spool valve 90 moves rightwardly. The second large-diameter portion 92 starts closing the orifice 96 as illustrated in FIG. 22C. Thereby, a lock operation is commenced. At that time, the torque characteristic represented by a graph n of FIG. 23C is realized. When the oil pressure becomes further higher, the orifice 96 is closed with the second large-diameter portion 92 as illustrated in FIG. 22D. Thus the lock operation is completed. When the oil pressure becomes further higher, the second spool valve 81 is put into abutting engagement with the second pin member 84 and the joint becomes in a bottoming state, as illustrated in FIG. 22E. In this case, the orifice 96 remains closed with the second large-diameter portion 92. Upon completion of the lock operation, if in the bottoming state, the torque characteristic represented by a graph o of FIG. 23 is realized. Thus, in the case of the third embodiment of FIG. 20, the torque characteristic to be realized by combining the increased-initial-torque characteristic with the automatic lock torque characteristic can be easily obtained only by changing the shape of the first spool valve 90 and the position of the orifice 96.

Figure 24:
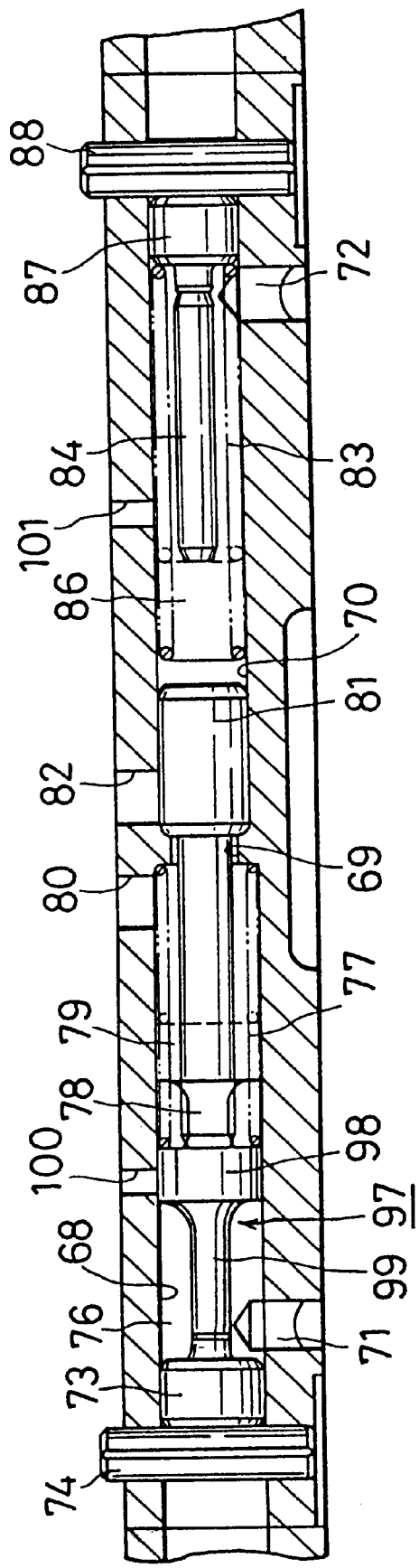
FIG. 24 is a sectional diagram for illustrating the structure of a valve of a fourth embodiment of the present invention.

FIG. 24 illustrates the valve structure of the fourth embodiment of the present invention. The two-stage torque characteristic can be obtained by employing this valve structure. A first spool valve 97 is enclosed in the first enclosing hole 68. The first spool valve 97 consists of a large-diameter portion 98 and a pin member 99 connected to the large-diameter portion 98 in such a way as to be integral therewith. A second orifice 100 for generating fluid resistance is formed between the first communicating hole 71 and the second communicating hole 80 and is closed with the large-diameter portion 98 in an initial state. When the oil pressure becomes equal to or higher than a predetermined value, the orifice 100 is opened. Further, a first orifice 101 is formed between the third communicating hole 82 and the fourth communicating hole 72 and to the right side of a tiped of the second pin member 84. Even when the second spool valve 81 moves rightwardly, this spool valve is brought into abutting engagement with the second pin member 84 and stops. Thus the first orifice 101 is not closed with the second spool valve 81 and is always opened. In comparison with the third embodiment of FIG. 20, the second large-diameter portion 92, the sixth communicating hole 95 and the third high-pressure chamber 94 are removed therefrom and instead, the first orifice 101 is added thereto.

Figure 25A:
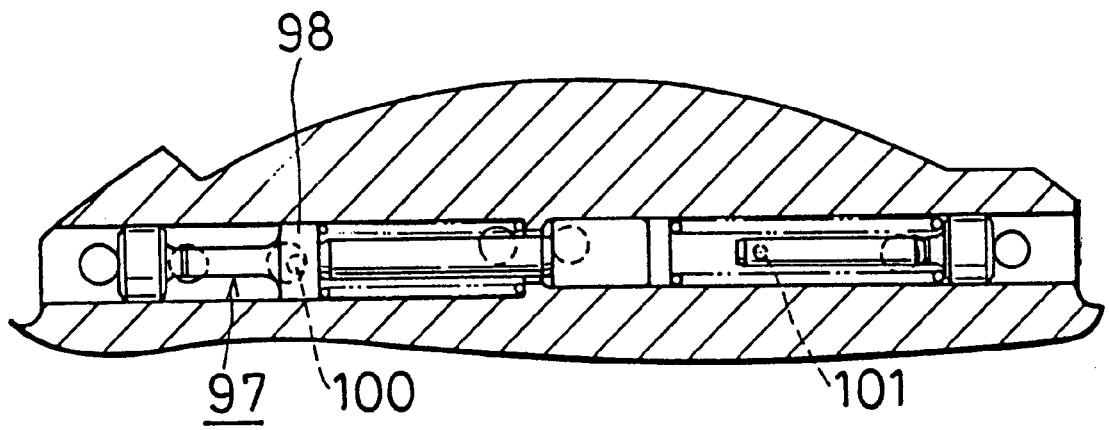
FIGS. 25A and 25B are diagrams for illustrating an operation of the fourth embodiment of the present invention.
Figure 25B:
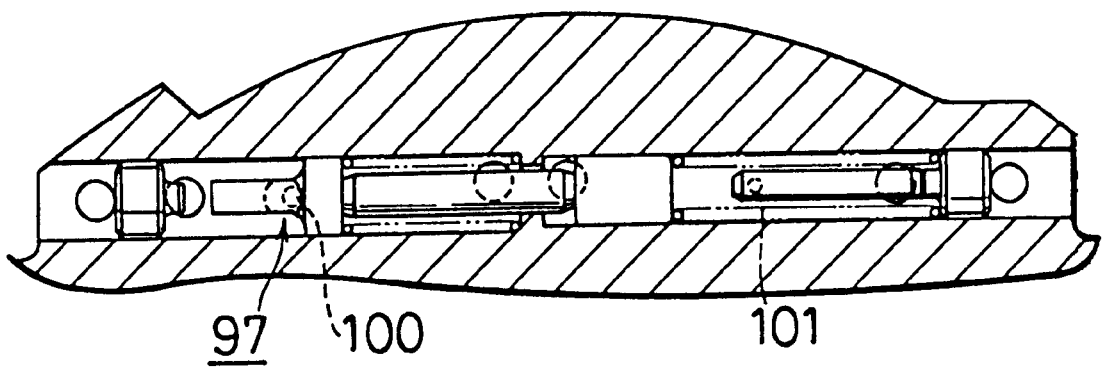
Figure 26A:
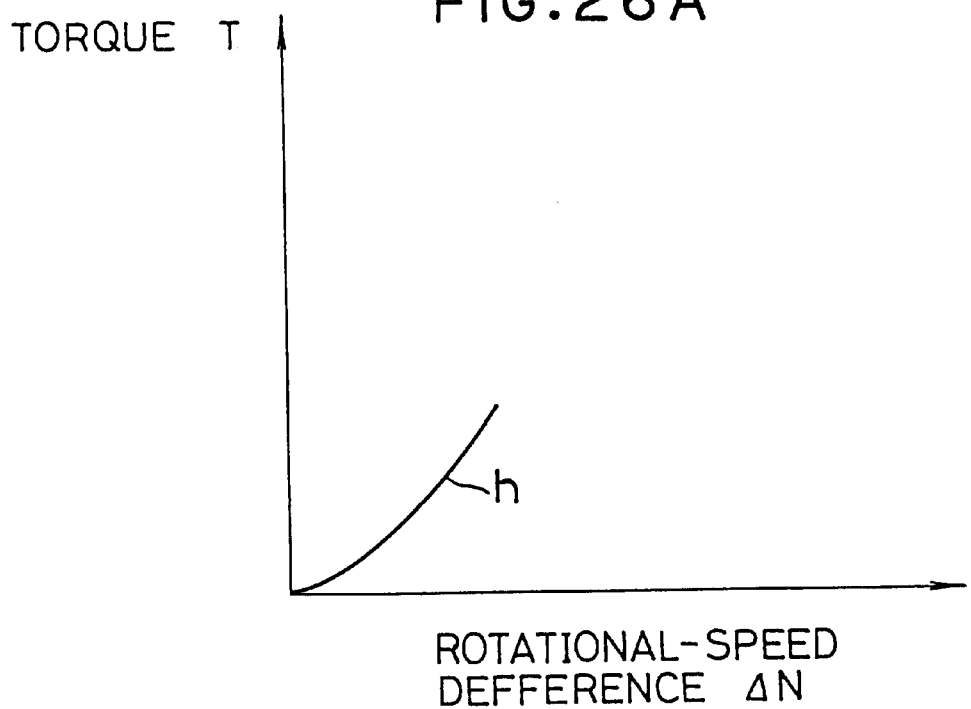
FIGS. 26A and 26B are diagrams for illustrating a torque characteristic of the fourth embodiment of the present invention.
Figure 26B:
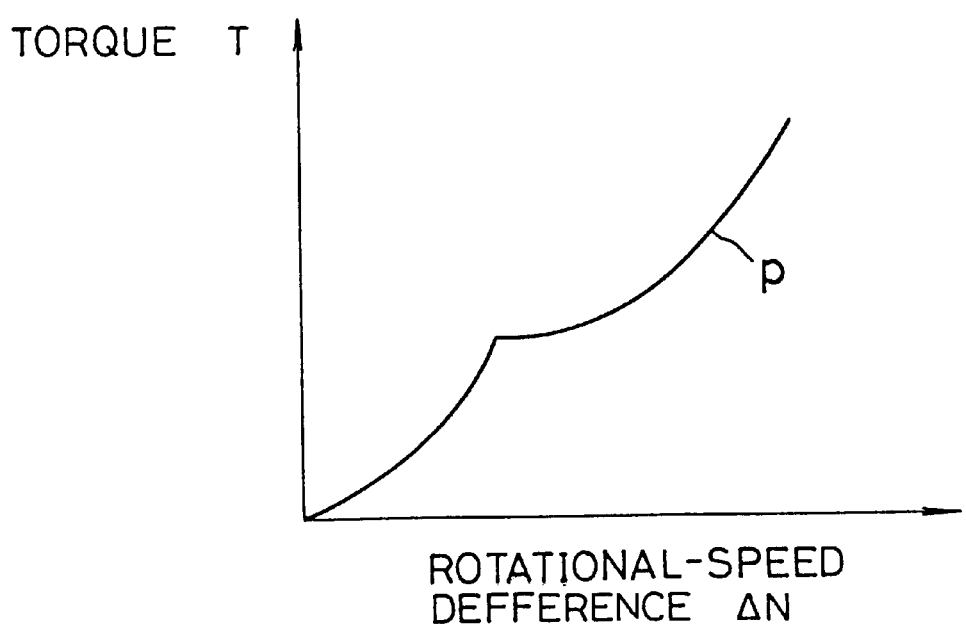

An operation of the fourth embodiment of FIG. 24 will be described hereinbelow. In an initial state, the first spool valve 97 does not move and the second orifice 100 is closed with the large-diameter portion 98 and the first orifice 101 is opened, as illustrated in FIG. 25A. Thus, a torque characteristic represented by a graph h of FIG. 26A is obtained. When the oil pressure rises and becomes equal to or higher than a predetermined value, the first spool valve 97 moves rightwardly and the second orifice 100 is opened, as illustrated in FIG. 25B. In this case, the first orifice 101 remains opened. Thus, the oil pressure is supplied to the first orifice 101 and the second orifice 100, so that the two-stage torque characteristic represented by a graph p of FIG. 26B is obtained. Thus, the fourth embodiment can obtain the two-stage torque characteristic by changing the shape of the first spool valve 90 of the third embodiment of FIG. 20 and removing the sixth communicating hole 95 but adding the first orifice 101 thereto.

Figure 27:
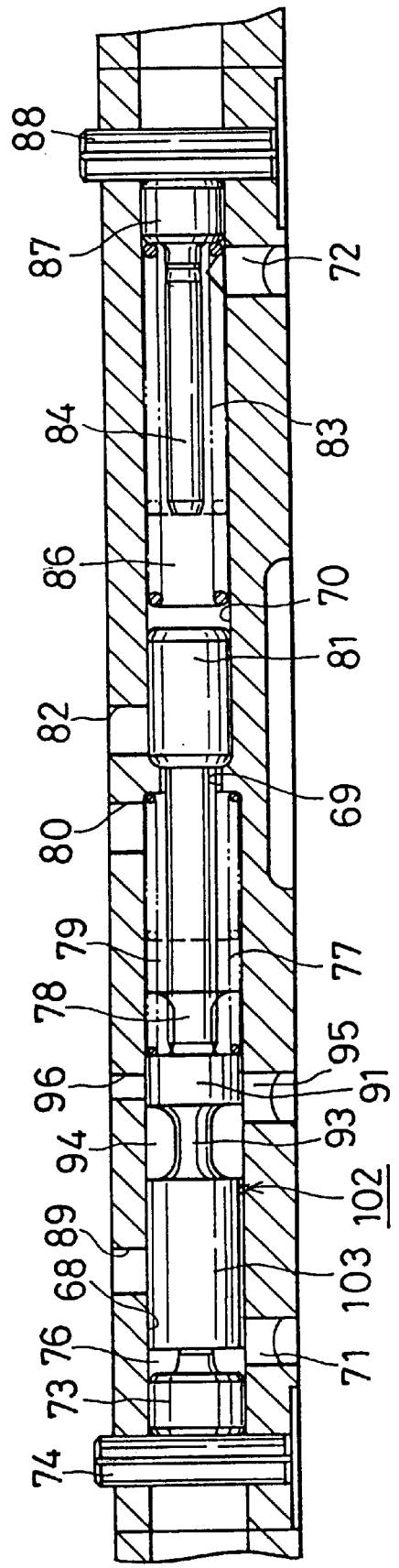
FIG. 27 is a sectional diagram for illustrating the structure of a valve of a fifth embodiment of the present invention.

FIG. 27 illustrates the valve structure of the fifth embodiment of the present invention. A torque characteristic to be realized by combining the increased-initial-torque characteristic with the torque characteristic of the limiter can be obtained by employing this valve structure. A first spool valve 102 is enclosed in the first enclosing hole 68. The first spool valve 102 has the first large-diameter portion 91, a second large-diameter portion 103 and the small-diameter portion 93 connecting the portion 91 with the portion 103. The second large-diameter portion 103 is longer than the first large-diameter portion 91 in axial size. The fifth communicating hole 89 is formed between the first communicating hole 71 and the sixth communicating hole 95 and communicates with the low-pressure chamber. The fifth communicating hole 89 is closed with the second large-diameter portion 103 when being in an initial state, and when the orifice 96 is opened. When the first spool valve 102 further moves, the fifth communicating hole 89 is opened and thus the oil pressure is relieved to the low-pressure chamber.

Figure 28A:
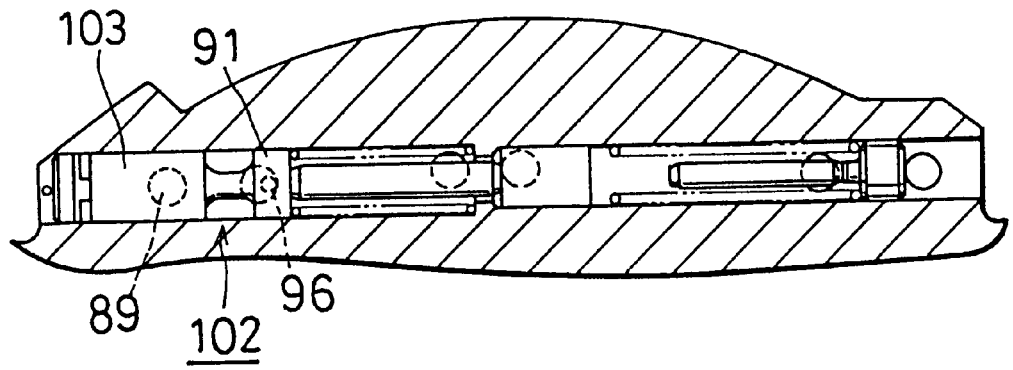
FIGS. 28A to 28C are diagrams for illustrating an operation of the fifth embodiment of the present invention.
Figure 28B:
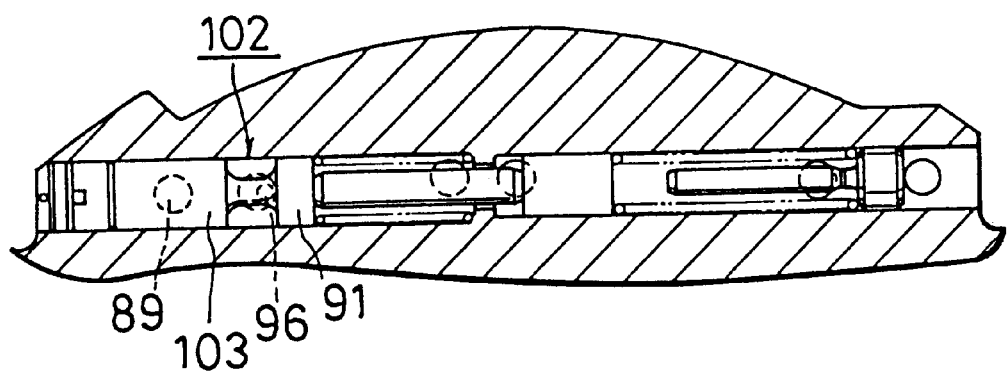
Figure 28C:
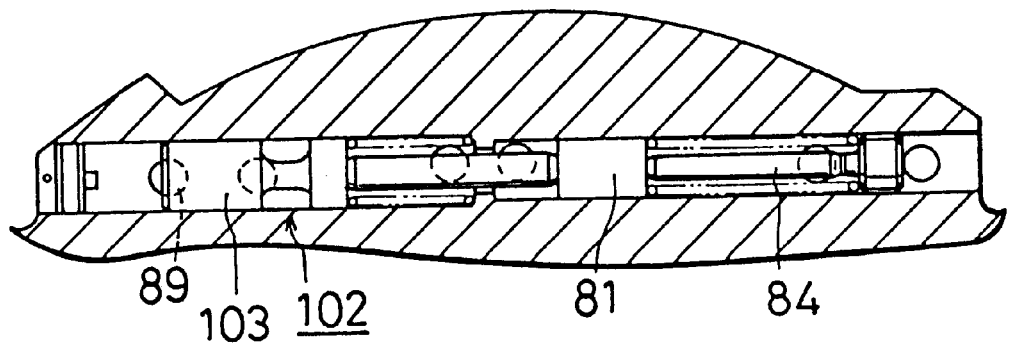
Figure 29A:
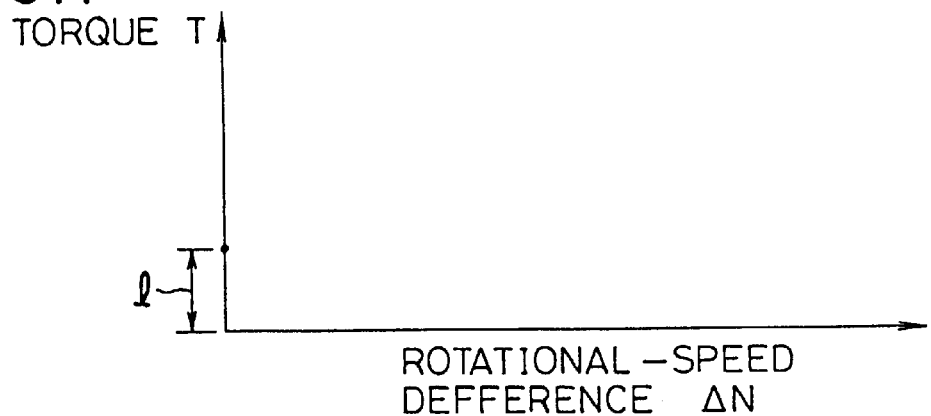
FIGS. 29A to 29C are diagrams for illustrating a torque characteristic of the fifth embodiment of the present invention.
Figure 29B:
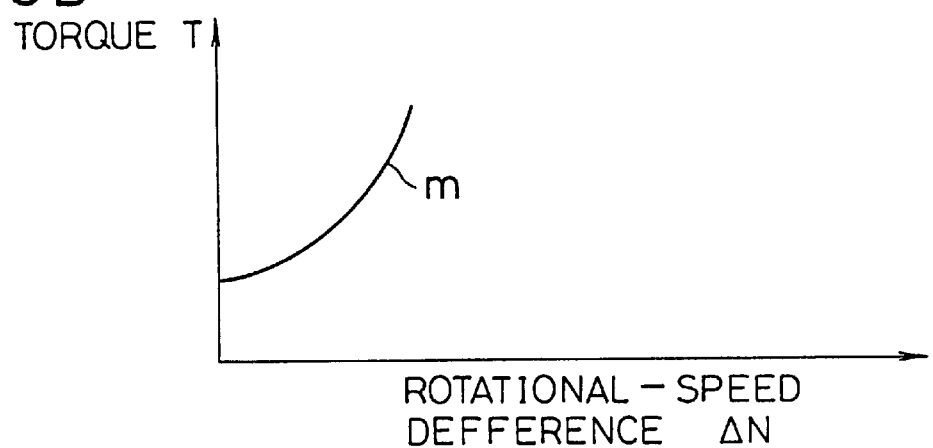
Figure 29C:
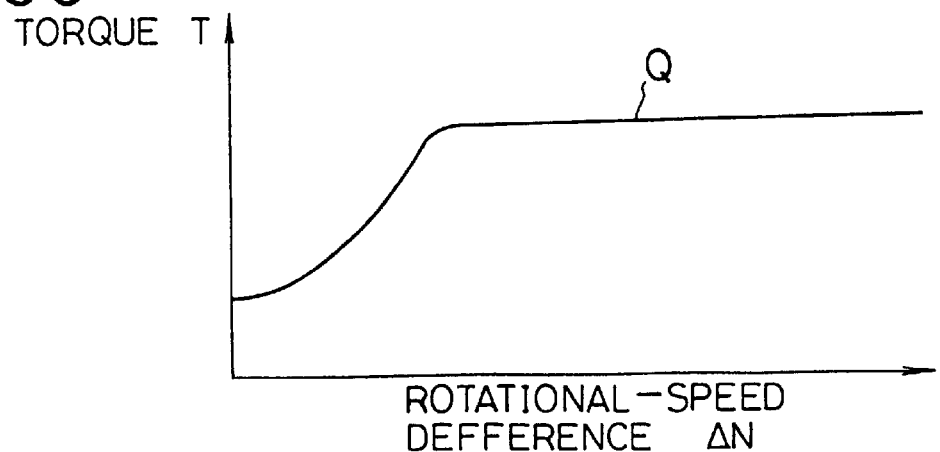

An operation of the fifth embodiment of FIG. 27 will be described hereunder. In an initial state, the first spool valve 102 does not move rightwardly and the fifth communicating hole 89 is closed with the second large-diameter portion 103 and the orifice 96 is closed with the first large-diameter portion 91, as illustrated in FIG. 28A. Thus, the increased-initial-torque characteristic represented by a graph l of FIG. 29A can be obtained. When the oil pressure becomes equal to or higher than a predetermined value, the orifice 96 is opened by the first large-diameter portion 91, as illustrated in FIG. 28B. At such an oil pressure, the fifth communicating hole 89 remains closed with the second large-diameter portion 103. Upon completion of opening of this orifice 96, a torque characteristic represented by a graph m of FIG. 29B is realized. When the oil pressure further rises, the first spool valve 102 moves further rightwardly. Further, the second large-diameter portion 103 opens the fifth communicating hole 89 and a pressure regulating operation is started, as illustrated in FIG. 28C. In a bottoming state in which the second spool valve 81 is brought into abutting engagement with the second pin member 84, the orifice 96 is put into a state just before closed with the second large-diameter portion 103. At that time, a torque characteristic represented by a graph Q of FIG. 29C can be obtained. Thus, in the case of the fifth embodiment, the torque characteristic to be realized by combining the increased-initial-torque characteristic with the torque characteristic of the limiter can be obtained by changing the shape of the first spool valve 102 of the third embodiment of FIG. 20 and forming the fifth communicating hole 89.

Figure 31:
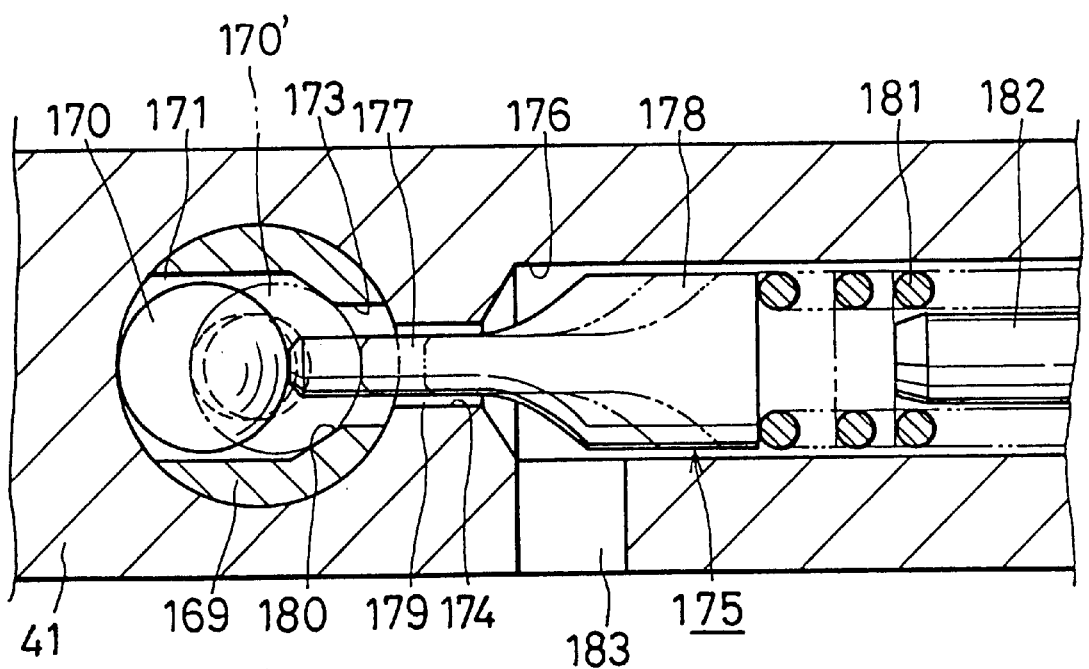
FIG. 31 is a sectional diagram taken on line 31—31 of FIG. 30.

FIG. 30 illustrates the valve structure of the sixth embodiment of the present invention. FIG. 31 is a sectional diagram taken on line 31—31 of FIG. 30. This sixth embodiment realizes the automatic lock torque characteristic, similarly as the first embodiment of FIG. 14 does. The sixth embodiment has a structure, by which the valve is prevented from sticking due to foreign particles contained in oil.

As shown in FIGS. 30 and 31, a high-pressure chamber 158 communicating with the discharge ports 44 through a communicating hole or passage 168 is formed in the rotary valve 41. The high-pressure chamber 158 is closed by screwing a plug 159 thereinto. A collar portion 169 made of a material hardened by a heat treatment or the like is enclosed in the high-pressure chamber 158. An enclosing chamber 171, in which a ball valve 170 is movably enclosed, is formed in the collar member 169. The enclosing chamber 171 communicates with the communicating hole 168 through an opening portion 172. Further, the enclosing chamber 171 communicates with a communicating hole or passage 174 through an opening portion 173. The communicating hole or passage 174 communicates with an enclosing chamber 176. A pin member 175 is slidably enclosed in the enclosing chamber 176. A low-pressure hole 183 communicating with a low-pressure chamber is formed in the enclosing chamber 176. The pin member 175 has a small-diameter pin portion 177 and a large-diameter base end portion 178. The pin portion 177 projects into the enclosing chamber 171 of the collar member 169 through the communicating hole 174. Thus the position of the ball valve 170 is controlled by the pin portion 177. A gap between the pin portion 177 and the communicating hole 174 constitutes an orifice for generating fluid resistance. Therefore, the communicating hole 174 can be made in such a manner as to have a large diameter. The precision of the diameter thereof can be low or rough. When the ball valve 170 is held by the pin member 175, the orifice 179 is open. When the pin member 175 retreats and thus the ball valve 170 becomes free, the valve 170 sits on a valve seat 180 formed in an opening portion 173 of the collar member 169, as indicated by reference character 170', and closes the orifice 179. The pin member 175 enclosed in the enclosing hole 176 is pressed or biased by a spring 181, so that the member 177 presses and holds the ball valve 170. As the internal oil pressure of the enclosing chamber 171 of the ball valve 170 becomes equal to or higher than a predetermined value, the pin member 175 moves rightwardly against the spring 181 and is brought into abutting engagement with a pin member 182. The pin member 182 prevents the pin member 175 from moving by a distance which is equal to or greater than a predetermined value.

Figure 5:
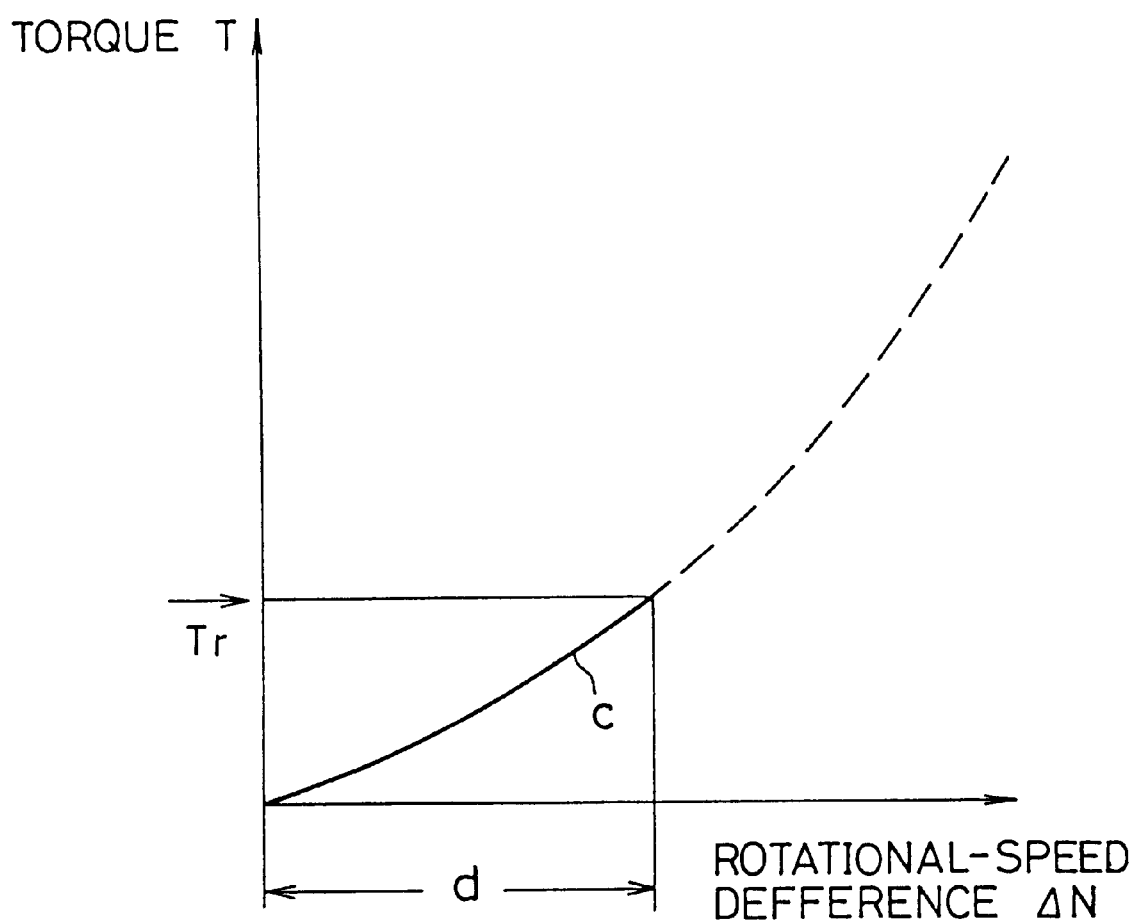
FIG. 5 is a graph for illustrating a torque characteristic in a normal period when the torque is equal to or less than the value of a lock torque.

Next, an operation of the sixth embodiment of FIGS. 30 and 31 will be described hereinbelow. In a range of the rotational speed difference in which a transmission torque due to the rotational speed difference between the two drive shafts is equal to or less than the lock torque Tr, a force of the spring 181 for pushing the pin member 175 is stronger than a force due to the internal oil pressure of the enclosing chamber 171 for pushing the pin member 175. Thus the ball valve 170 is held by the pin portion 177 of the pin member 175. Further, the orifice 179 is open. Moreover, oil discharged from the discharge ports 44 passes through the orifice 179. At that time, the torque characteristic represented by the graph c of FIG. 5 is realized.

Figure 6:
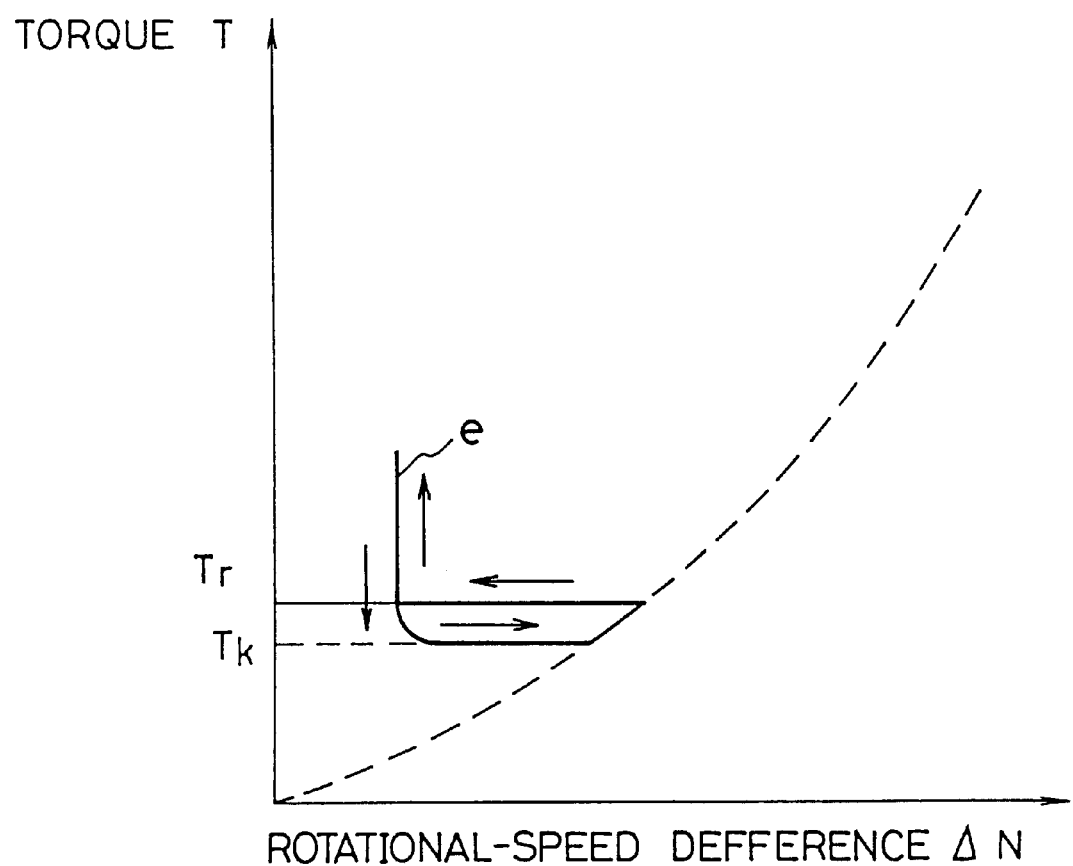
FIG. 6 is a graph for illustrating a torque characteristic when locked.
Figure 7:
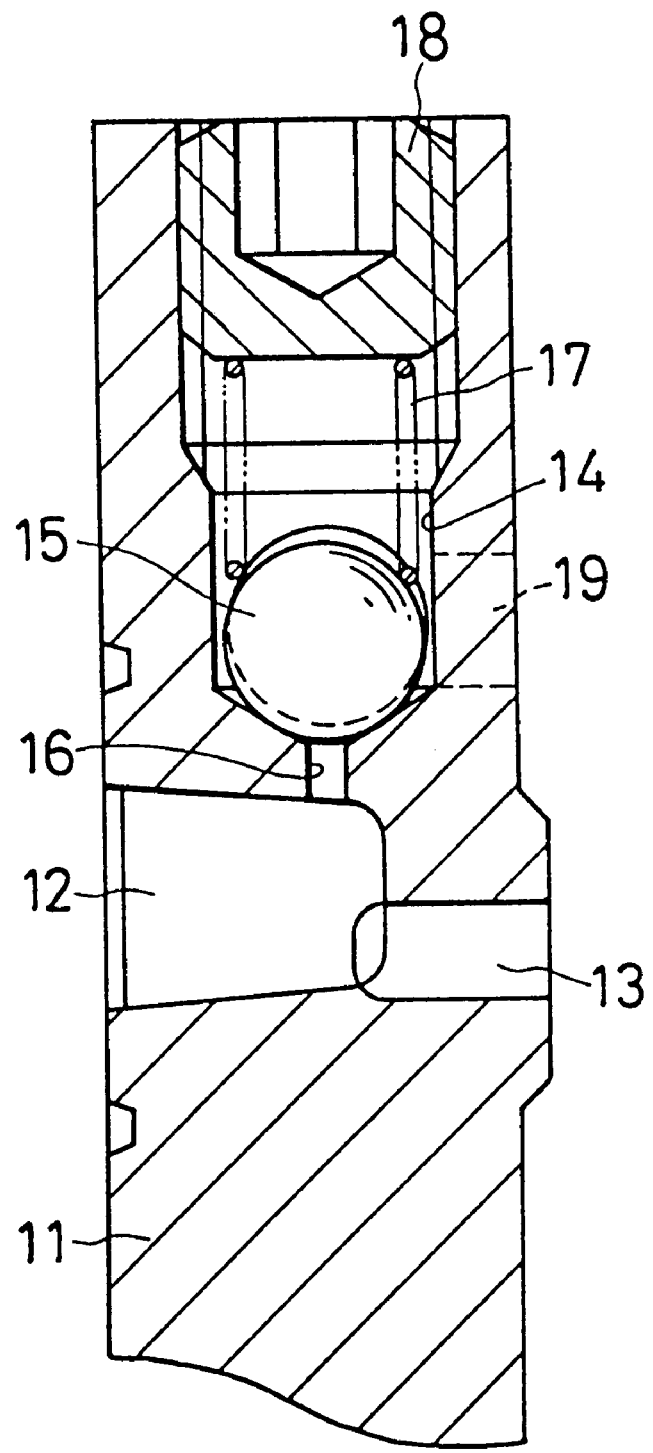
FIG. 7 is a diagram for illustrating the structure of the rotary valve of the conventional joint in the case that an initial torque is upped or increased.
Figure 8:
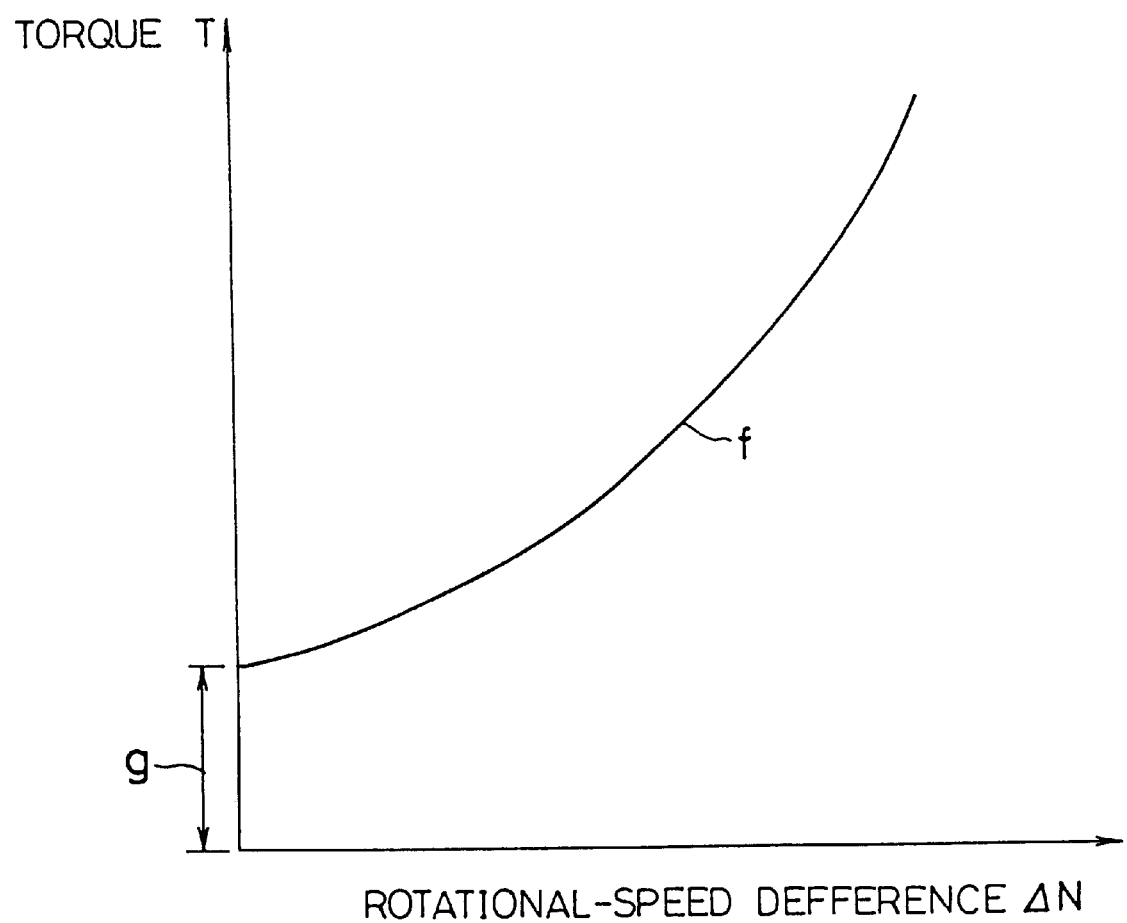
FIG. 8 is a graph for illustrating a torque characteristic that the initial torque is upped.
Figure 9:
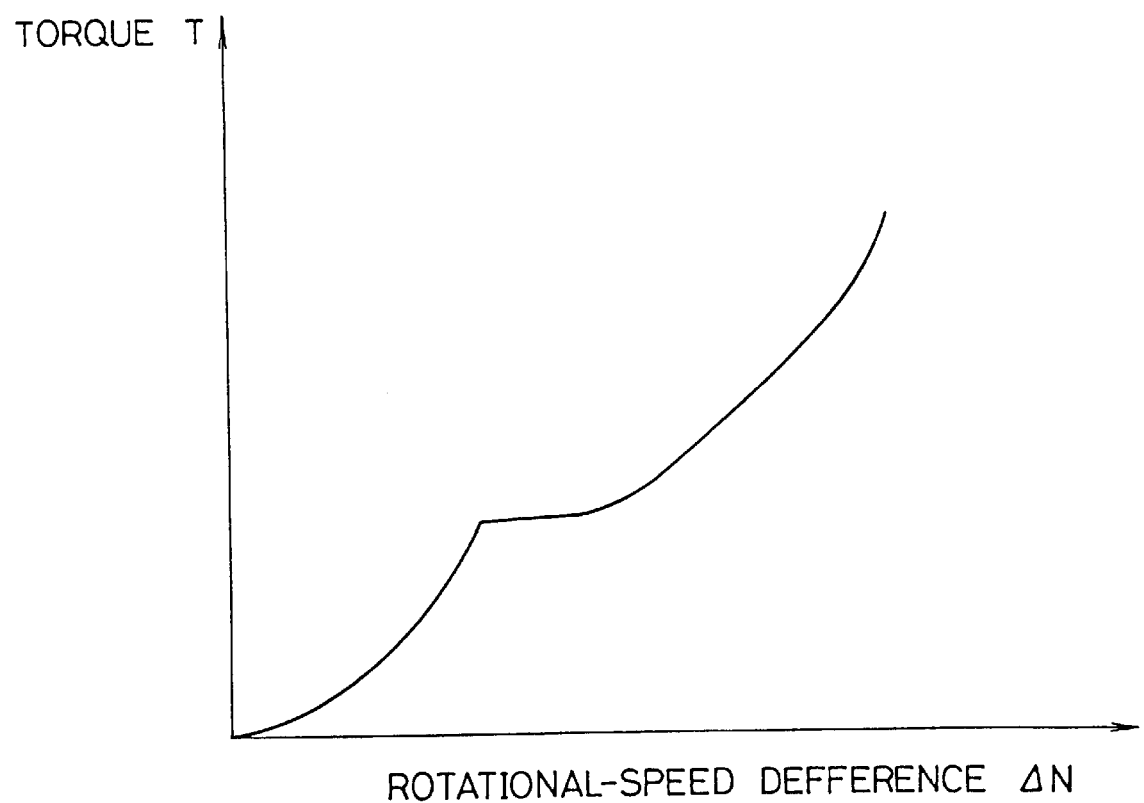
FIG. 9 is a graph for illustrating a two-stage torque characteristic.
Figure 10:
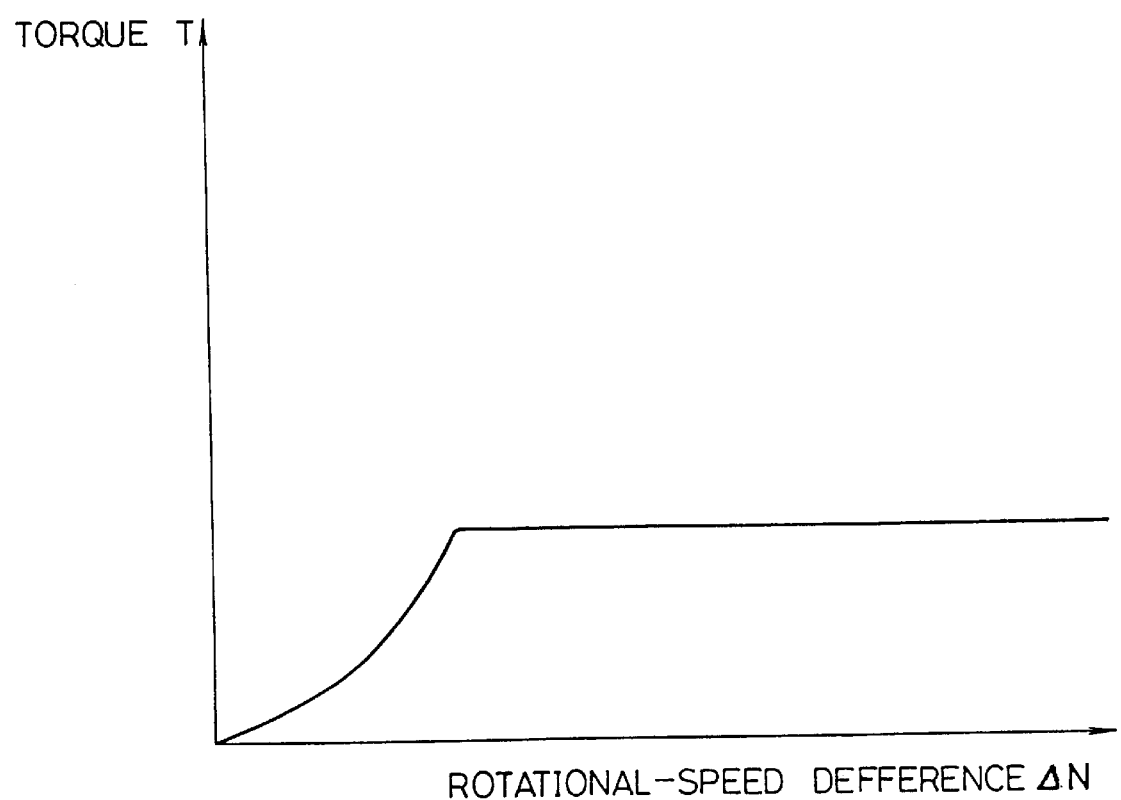
FIG. 10 is a graph for illustrating a torque characteristic of a torque limiter.
Figure 11:
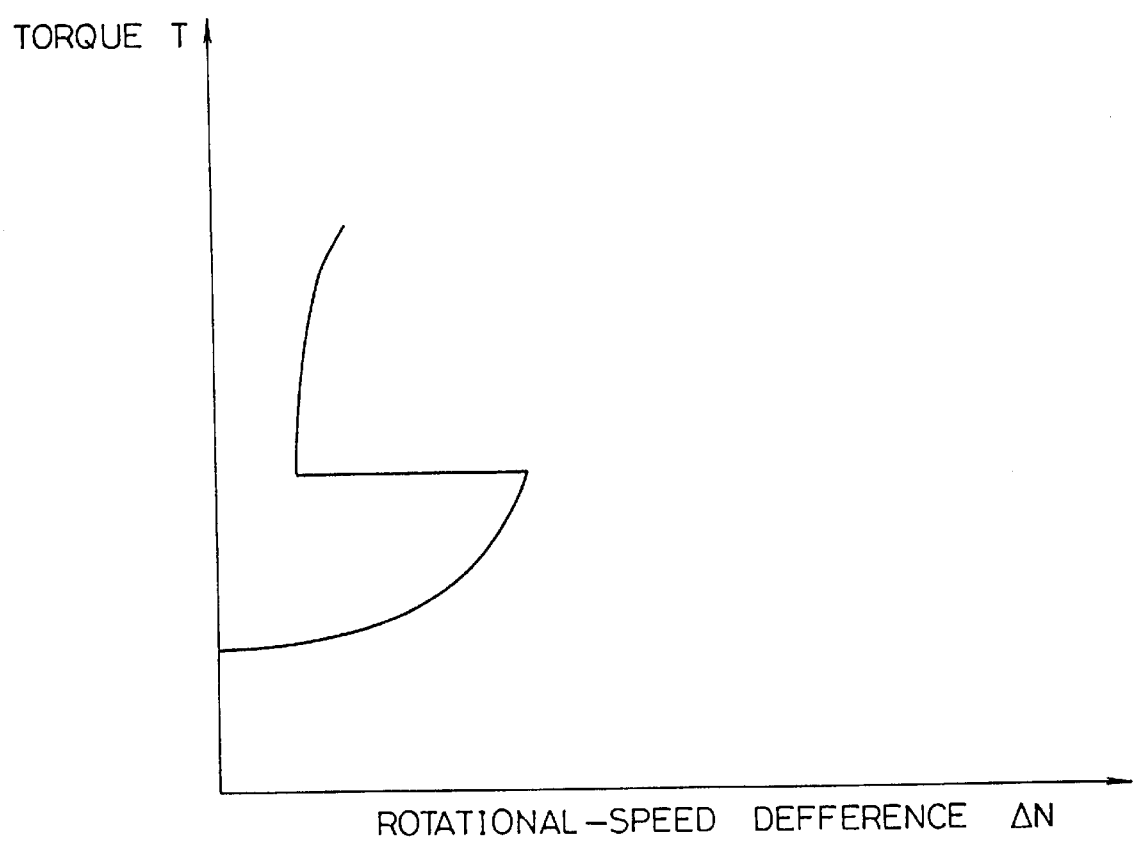
FIG. 11 is a graph for illustrating a torque characteristic obtained from the combination of an increased-initial-torque characteristic and an automatic lock characteristic.

Next, when the rotational speed difference increases and the oil pressure rises and the rotational speed difference moves into a range where the torque becomes equal to or higher than the lock torque Tr, the force due to the internal oil pressure of the enclosing chamber 171 for pushing the pin member 175 becomes stronger than the force of the spring 181 for pushing the pin member 175. Thus, the pin member 175 moves rightwardly against the spring 181. Further, the ball valve 170 becomes free and seats on the valve seat 180, as indicated by reference character 170', and thus closes the orifice 179. At that time, the lock characteristic represented by the graph e of FIG. 6 is realized. If the rotational speed difference decreases and the oil pressure lowers after being locked, the ball valve 170 leaves the valve seat 180 when the torque is reduced to the torque Tk lower than the lock torque Tr. Thus the valve 170 opens the orifice 179 again. Consequently, the torque represented by the graph c of FIG. 5 is obtained again.

In the case of the valve structure of the sixth embodiment of FIG. 30, the gap between the pin portion 177 of the pin member 175 holding the ball valve 170 and the communicating hole 174 is formed as the orifice 179. As a result, the gap between the pin portion 177 and the communicating hole 174 becomes large. Thereby, the pin member 175 can be securely prevented from becoming stuck due to foreign particles which have been contained in oil and have adhered to the gap. Moreover, because the orifice 179 is formed, the diameter of the communicating hole 174 can be made to be large in comparison with the diameter of the pin portion 177. The working accuracy of the diameter of the hole can be low or rough. Further, although the ball valve 170 strikes the valve seats 180 when locked, the orifice 179 is not damaged by shock because the valve seat 180 is formed on the hardened collar member 169. Consequently, the endurance thereof against shock can be enhanced.

Figure 32:
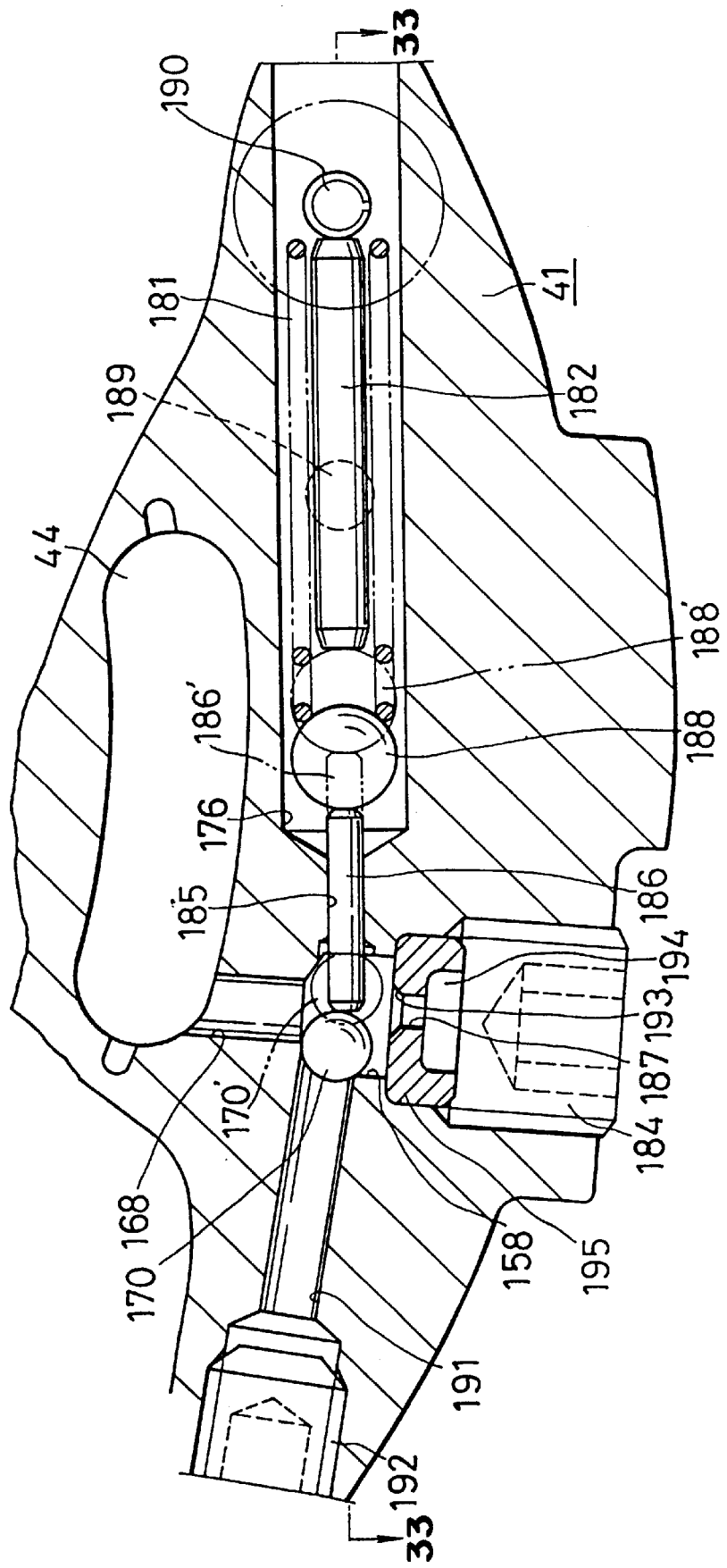
FIG. 32 is a sectional diagram for illustrating the structure of a valve of a seventh embodiment of the present invention.
Figure 33:
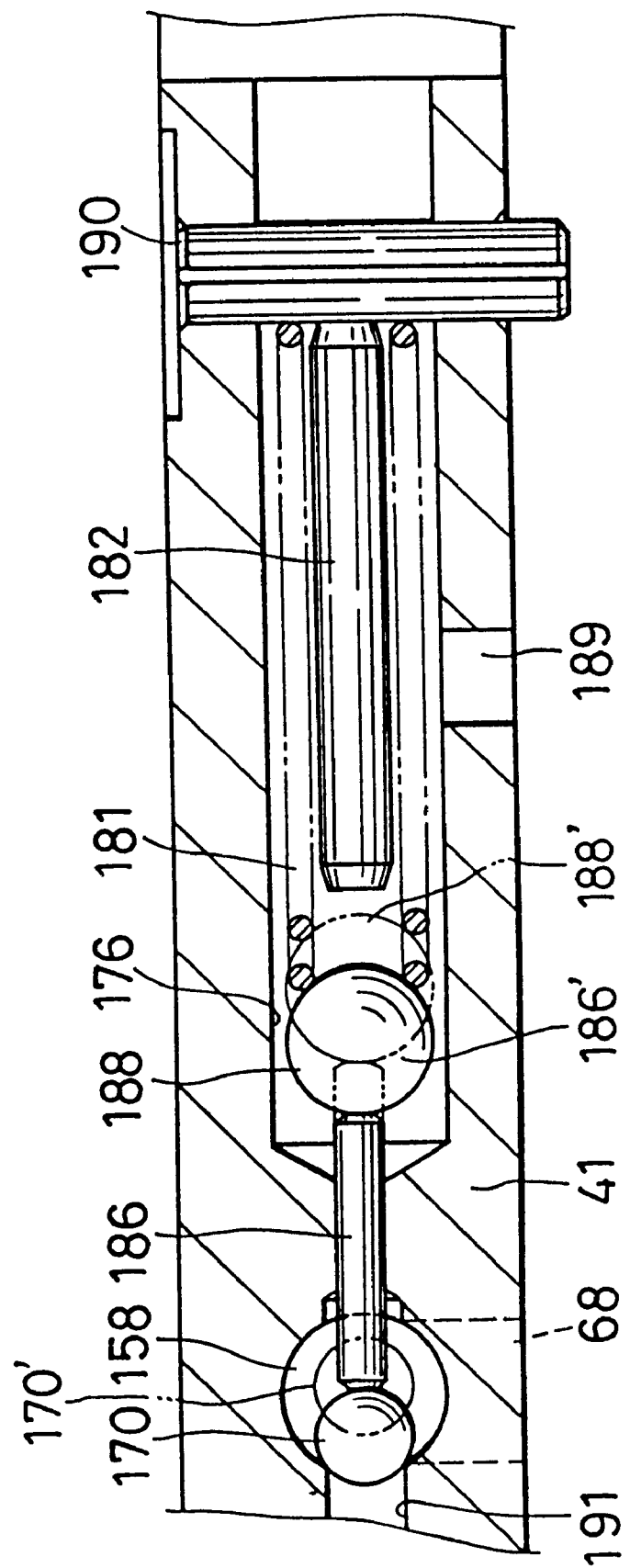
FIG. 33 is a sectional diagram taken on line 33—33 of FIG. 32.

FIG. 32 illustrates the valve structure of the seventh embodiment of the present invention. FIG. 33 is a sectional diagram taken on line 33—33 of FIG. 32. In this seventh embodiment, the high-pressure chamber 158 communicates with the discharge ports 44 of the rotary valve 41 through the communicating hole or passage 168. A collar member 195, made of a material hardened by a heat treatment or the like, is enclosed in a lower portion of the high-pressure chamber 158 by screwing of this member thereinto. An orifice 187 for generating fluid resistance is formed in the collar member 195. Further, a valve seat 193 is formed on a ball-valve-side portion of the orifice 187. A low-pressure chamber 194 is formed in a part, which is near to a plug 184, of the high-pressure chamber 158, in which the collar member 195 is enclosed. The ball valve 170 is movably enclosed in the high-pressure chamber 158. The pin member 186 is slidably inserted into a communicating hole or passage 185 which provides communication from the high-pressure chamber 158 to an enclosing hole or chamber 176. Further, the enclosing hole 176 for the pin member 186 is provided in the rotary valve. A spring 181 for pressing the pin member 186 leftwardly, a ball 188 intervening between the pin member 186 and the spring 181 and a pin member 182 for blocking the rightward movement of the pin member 186 are enclosed in the enclosing hole or chamber 176. The pin member 182 is engaged with and caught by a stopper pin 190. Further, the enclosing hole 176 has a discharge hole 189 as an opening thereof. The discharge hole 189 is used to discharge oil, which has leaked into the enclosing hole 176 from the low-pressure chamber. Moreover, the high-pressure chamber 158 has a working hole or passage 191 as an opening thereof. The working hole 191 is closed with a plug 192.

Hereinafter, an operation of the seventh embodiment of FIGS. 32 and 33 will be described. In the case of a normal operation in which the rotational speed difference is small, a force of the spring 181 for pushing the pin member 186 through the ball 188 is stronger than a force due to the internal oil pressure of the high-pressure chamber 158 for pressing the pin member 186. Thus the ball valve 170 is pressed by the pin member 186 against an opening portion of the working hole 191 and is held thereon. Therefore, oil discharged from the discharge ports 44 flows through the orifice formed in the collar member 195 into the low-pressure chamber 194. At that time, the torque characteristic represented by the graph c of FIG. 5 is realized. If the rotational speed difference increases and the internal oil pressure of the high-pressure chamber 158 rises and thus the rotational speed difference moves is put into a range where the torque becomes equal to or higher than the lock torque Tr, the force pushing pin member 186 due to the internal oil pressure of the high-pressure chamber 158 becomes stronger than the force of the spring 181 for pushing the pin member 186 through the ball 188. Thus, the pin member 186 moves rightwardly against the force of the spring 181 as viewed in these figures. As a result, the ball valve 170 becomes free and sits on the valve seat 193 of the collar member 195 and closes the orifice 187. At that time, the torque characteristic represented by the graph e of FIG. 6 is realized.

In the case of this seventh embodiment, the orifice 187 is formed in the collar member 195 made of a hardened material. Consequently, the orifice 187 is not damaged by shock caused by the ball valve 170 when locked. Thereby, the endurance can be enhanced.

Incidentally, the numerical values described in the foregoing description of the embodiments thereof should not be construed to limit the scope of the present invention.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A hydraulic power transmission joint for transmitting a torque according to a difference between rotational speeds of shafts of left and right drive wheels, comprising:
    a cam housing which is provided between input and output shafts being capable of performing a relative rotation and is connected to one of the shafts and has a cam face having two or more cam noses formed on an inside surface thereof;
    a rotor connected to the other of the shafts and rotatably enclosed in the cam housing, in which a plurality of plunger chambers are formed in a direction of an axis thereof;
    a plurality of plungers which are enclosed in the plurality of plunger chambers, respectively, in such a manner as to be able to perform a reciprocative movement by a pressing force of a corresponding return spring and are driven by the cam face when a relative rotation of one of the shafts with respect to the other thereof;
    intake/discharge holes which are formed in the rotor and communicate with the plunger chambers;
    a rotary valve which is rotatably and slidably brought into contact with an end surface of the rotor and is positioned in such a way as to have a positional relation with the cam housing and has a plurality of intake and discharge ports that are formed in surface portions thereof and act as intake and discharge valves, respectively, according to a positional relation thereof with the intake/discharge holes; and
    a valve structure, provided in the rotary valve, for realizing a combination of a torque characteristic that an initial torque is upped or increased according to an oil pressure supplied from the discharge port and an automatic lock characteristic, wherein the valve structure has a first enclosing hole is formed in the rotary valve, wherein in the first enclosing hole, the valve structure comprises:
        a first spool valve having first and second large-diameter portions;
        a first spring for pressing the first spool valve;
        a first pin member adapted to be caused by the first spool valve to move;
        a first communicating hole, which communicates with a high-pressure chamber, is provided in a first-spool-valve-side portion thereof;
        a second communicating hole, which communicates with a low-pressure chamber, is provided in a first-pin-member-side portion thereof;
        a sixth communicating hole, which communicates with the high-pressure chamber, provided between the first and second large-diameter portions; and
        an orifice, which is first closed by the first large-diameter portion and subsequently, is closed by the second large-diameter portion as a result of a movement of the first spool valve, and is adapted to be closed by a movement of the second spool valve and to generate fluid resistance by a flow of discharge oil caused by driving the plungers,
    wherein the valve structure further has a second enclosing hole which is formed in the rotary valve and has a diameter smaller than that of the first enclosing hole, wherein in the second enclosing hole, the valve structure further comprises:
        a second spool valve having a diameter smaller than that of the first spool valve;
        a second spring to be compressed by a movement of the second spool valve;
        a second pin member for stopping a movement of the second spool valve;
        a third communicating hole which communicates with the low-pressure chamber a nd is formed in a second-spool-valve-side portion of the second enclosing hole; and
        a fourth communicating hole which communicates with the high-pressure chamber and is formed in a second-pin-member-side portion of the second enclosing hole.

2. A hydraulic power transmission joint for transmitting a torque according to a difference between rotational speeds of shafts of left and right drive wheels, comprising:
    a cam housing which is provided between input and output shafts being capable of performing a relative rotation and is connected to one of the shafts and has a cam face having two or more cam noses formed on an inside surface thereof;
    a rotor connected to the other of the shafts and rotatably enclosed in the cam housing, in which a plurality of plunger chambers are formed in a direction of an axis thereof;
    a plurality of plungers which are enclosed in the plurality of plunger chambers, respectively, in such a manner as to be able to perform a reciprocative movement by a pressing force of a corresponding return spring and are driven by the cam face when a relative rotation of one of the shafts with respect to the other thereof;
    intake/discharge holes which are formed in the rotor and communicate with the plunger chambers;
    a rotary valve which is rotatably and slidably brought into contact with an end surface of the rotor and is positioned in such a way as to have a positional relation with the cam housing and has a plurality of intake and discharge ports that are formed in surface portions thereof and act as intake and discharge valves, respectively, according to a positional relation thereof with the intake/discharge holes; and
    a valve structure, provided in the rotary valve, for realizing a torque characteristic that a change in torque according -to an oil pressure supplied from the discharge port has at least two stages, wherein the valve structure has a first enclosing hole is formed in the rotary valve, wherein in the first enclosing hole, the valve structure comprises:
        a first spool valve having first and second large-diameter portions;
        a first spring for pressing the first spool valve;
        a first pin member adapted to be caused by the first spool valve to move;

a first communicating hole, which communicates with a high-pressure chamber, is provided in a first-spool-valve-side portion thereof;

a second communicating hole, which communicates with a low-pressure chamber, is provided in a first-pin-member-side portion thereof; and an orifice, which is first closed by the first large-diameter portion and subsequently, is closed by the second large-diameter portion as a result of a movement of the first spool valve, and is adapted to be closed by a movement of the second spool valve and to generate fluid resistance by a flow of discharge oil caused by driving the plungers, wherein the valve structure further has a second enclosing hole which is formed in the rotary valve and has a diameter smaller than that of the first enclosing hole, wherein in the second enclosing hole, the valve structure further comprises:

a second spool valve having a diameter smaller than that of the first spool valve;

a second spring to be compressed by a movement of the second spool valve;

a second pin member for stopping a movement of the second spool valve;

a third communicating hole which communicates with the low-pressure chamber and is formed in a second-spool-valve-side portion of the second enclosing hole;

a fourth communicating hole which communicates with the high-pressure chamber and is formed in a second-pin-member-side portion of the second enclosing hole; and an orifice, which is always opened and is provided between the third and fourth communicating holes and is adapted to generate fluid resistance by a flow of discharge oil caused by driving the plungers.

3. A hydraulic power transmission joint for transmitting a torque according to a difference between rotational speeds of shafts of left and right drive wheels, comprising:

a cam housing which is provided between input and output shafts being capable of performing a relative rotation and is connected to one of the shafts and has a cam face having two or more cam noses formed on an inside surface thereof;

a rotor connected to the other of the shafts and rotatably enclosed in the cam housing, in which a plurality of plunger chambers are formed in a direction of an axis thereof;

a plurality of plungers which are enclosed in the plurality of plunger chambers, respectively, in such a manner as to be able to perform a reciprocative movement by a pressing force of a corresponding return spring and are driven by the cam face when a relative rotation of one of the shafts with respect to the other thereof;

intake/discharge holes which are formed in the rotor and communicate with the plunger chambers;

a rotary valve which is rotatably and slidably brought into contact with an end surface of the rotor and is positioned in such a way as to have a positional relation with the cam housing and has a plurality of intake and discharge ports that are formed in surface portions thereof and act as intake and discharge valves, respectively, according to a positional relation thereof with the intake/discharge holes; and a valve structure, provided in the rotary valve, for realizing a combination of a torque characteristic that an initial torque is increased according to an oil pressure supplied from the discharge port and a torque characteristic in case of using a limiter for limiting a torque to a prescribed oil pressure, wherein the valve structure has a first enclosing hole is formed in the rotary valve, wherein in the first enclosing hole, the valve structure comprises:

a first spool valve having first and second large-diameter portions;

a first spring for pressing the first spool valve;

a first pin member adapted to be caused by the first spool valve to move;

a first communicating hole, which communicates with a high-pressure chamber, is provided in a first-spool-valve-side portion thereof;

a second communicating hole, which communicates with a low-pressure chamber, is provided in a first-pin-member-side portion thereof;

a sixth communicating hole, which communicates with the high-pressure chamber, provided between the first and second large-diameter portions; and an orifice, which is first closed by the first large-diameter portion and subsequently, is closed by the second large-diameter portion as a result of a movement of the first spool valve, and is adapted to be closed by a movement of the second spool valve and to generate fluid resistance by a flow of discharge oil caused by driving the plungers, wherein the valve structure further has a second enclosing hole which is formed in the rotary valve and has a diameter smaller than that of the first enclosing hole, wherein in the second enclosing hole, the valve structure further comprises:

a second spool valve having a diameter smaller than that of the first spool valve;

a second spring to be compressed by a movement of the second spool valve;

a second pin member for stopping a movement of the second spool valve;

a third communicating hole which communicates with the low-pressure chamber and is formed in a second-spool-valve-side portion of the second enclosing hole; and a fourth communicating hole which communicates with the high-pressure chamber and is formed in a second-pin-member-side portion of the second enclosing hole, wherein the valve structure has a fifth communicating hole which communicates with the low-pressure chamber as a result of the first spool valve and is provided between the first and sixth communicating holes, wherein a size of the second large-diameter portion in a direction of an axis of the first spool valve is increased.

* * * * *